United States Patent

[11] 3,588,823

[72] Inventors Chao K. Chow
Chappaqua;
Chao N. Liu, Yorktown Heights, N.Y.
[21] Appl. No. 716,732
[22] Filed Mar. 28, 1968
[45] Patented June 28, 1971
[73] Assignee International Business Machines Corporation
Armonk, N.Y.

[54] MUTUAL INFORMATION DERIVED TREE STRUCTURE IN AN ADAPTIVE PATTERN RECOGNITION SYSTEM
14 Claims, 30 Drawing Figs.

[52] U.S. Cl. .......... 340/146.3, 340/172.5
[51] Int. Cl. .......... G06k 9/00
[50] Field of Search .......... 340/146.3, 172.5

[56] References Cited

UNITED STATES PATENTS 3,045,911 7/1962 Russell et al. .......... (340/146.3UX)
3,239,811 3/1966 Bonner .......... 340/146.3
3,275,985 9/1966 Dunn et al. .......... 340/146.3

*Primary Examiner*—Maynard R. Wilbur
*Assistant Examiner*—Leo H. Boudreau
*Attorneys*—Hanifin and Jancin and Graham S. Jones, II

ABSTRACT: An adaptive pattern recognition system is provided which calculates the mutual information provided by pairs of features extracted by a feature extracting device. The relative magnitudes of mutual information are detected seriatim and a closed loop avoidance module prevents forming a closed loop, to retain a statistical tree relationship. Pattern logic stores the set of pairs having highest values of mutual information. Then the system is prepared to operate as a recognition system. The individual features are weighted, according to statistical analysis, by analogue computers. Also, the pairs of information are gated and weighted for each pattern in accordance with statistical weighting principles. The summing networks for a plurality of patterns are compared in a maximum detector for ultimate recognition of the most likely pattern identification.

Patented June 28, 1971 3,588,823

24 Sheets-Sheet 1

INVENTORS
CHAO KONG CHOW
CHAO-NING LIU

BY Graham S. Jones II
ATTORNEY

| | | | | |
|---|---|---|---|---|
| $I_{12}$ 0.21 | $I_{13}$ 0.34 | $I_{14}$ 0.59 (2) | $I_{15}$ 0.10 | $I_{16}$ 0.55 |
| | $I_{23}$ 0.48 (5) | $I_{24}$ 0.37 | $I_{25}$ 0.29 | $I_{26}$ 0.41 |
| | | $I_{34}$ 0.44 | $I_{35}$ 0.60 (1) | $I_{36}$ 0.58 (3) |
| | | | $I_{45}$ 0.56 (4) | $I_{46}$ 0.10 |
| | | | | $I_{56}$ 0.33 |
FIG. 2A
FIG. 2B
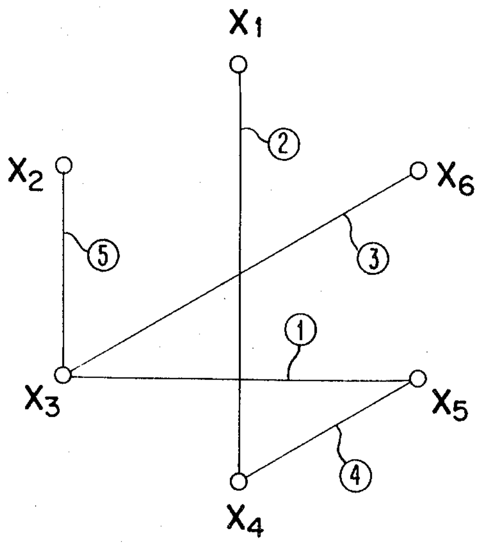
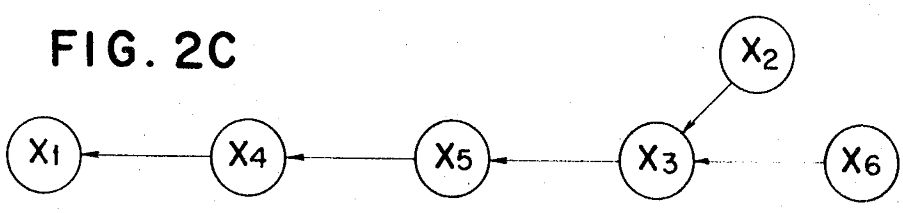
FIG. 2C

CLOSED LOOP AVOIDANCE MODULE

Patented June 28, 1971 3,588,823

24 Sheets-Sheet 10

Patented June 28, 1971 3,588,823

24 Sheets-Sheet 12

MUTUAL INFORMATION COMPUTER

SUMMING NETWORK

MUTUAL INFORMATION DERIVED TREE STRUCTURE IN AN ADAPTIVE PATTERN RECOGNITION SYSTEM

BACKGROUND OF THE INVENTION

This invention relates to pattern recognition. In a paper by C.K. Chow entitled "A Recognition Method Using Neighbor Dependence" IRE Transactions on Electronic Computers, Volume EC-11, Pages 683–690, Oct. 1962, he teaches that it is helpful to consider the interrelationship between spatially adjacent characteristics or neighborhood information in performing character recognition. However, in general pattern recognition problems the interrelationship between features cannot always be defined by neighborhood information.

Others suggest combining characteristics to form new characteristics and to take advantage of dependence. In other words, others have considered the problem of approximating an $n$th order binary distribution by a product of several of its lower order component distributions. It has been shown that the product approximation, under suitably restricted conditions, has the property of minimum information.

None of the prior approaches suggested a way to provide the optimal dependence second order or cross-correlation information for processing inputs in an adaptive system which is capable of closing the circuits which will combine the pertinent characteristics.

In the past, extensive trial and error methods of selecting optimal relationships of interdependence have been used. This is time consuming. The present system provides means for performing this selection function relatively automatically. A tree or "open" structure of interrelationships is developed based upon mutual information which is represented by pair of characteristics. As a matter of choice it was decided to employ first order cross correlation, which is second order information, i.e., pairs rather than units. The mutual information between any two characteristics $X_i$ and $X_j$ measures the dependence between them.

A system is shown here for best approximating an $n$th order distribution by a product of $n-1$ second order component distributions.

In many applications, the probability distribution function is not explicitly given and it is usually necessary to construct a distribution function from the samples. The optimum approximation procedure is extended to empirical observations. Our procedure maximizes the likelihood function, and therefore it is a maximum likelihood estimator of the distribution of tree dependence. Now we employ a selected most relevant quantity of pairs of information which forms a statistical tree or interconnected structure of feature relationships which is obtained by using $n-1$ mutual information cross products where there are $n$ features.

We have an adaptive pattern recognition system employing tree dependence among second order relationships between features being extracted from data. Alternatively we have a system for deriving the tree structure.

TECHNICAL BACKGROUND

In recent years considerable effort has been devoted to pattern recognition and adaptive systems. Pattern recognition is basically a decision problem, the problem of deciding to which class the unknown pattern belongs. In developing decision networks there usually are two levels of design: the first is concerned with the selection of the network structure, and the second with the optimization of the parameters once the structure is fixed.

As is commonly true in pattern recognition problems, information about the patterns is not given in any form suitable for immediate application of mathematical analysis; rather, it must be inferred from a set of sample patterns. Because of this necessity of inference, adaptive techniques as well as statistical estimation methods have been found useful in pattern recognition.

Most adaptation in pattern recognition to date has been based on parameter optimization. One generally starts with a fixed recognition structure, usually linear, and the problem is then to set the parameters in some optimal fashion.

More generally, the structure of the recognition networks, not just the parameters, must in some sense reflect the structure of the pattern classes. This necessitates matching or adapting the network structure to the input data.

Considering pattern recognition as a statistical decision problem, the structure of a recognition system can be derived from the functional form of the underlying probability distributions. Successive approximations to the distribution functions lead to a hierarchy of recognition structures. A subset of these structures which consist of linear, chain, and tree structures, is of particular interest here.

Any constraint on the approximating functions induces a corresponding constraint on the structures. To limit the class of structures available for consideration, we impose a reasonable constraint on the approximating probability functions, namely, that of independence or first-order dependence among the measurements.

Definition: A linear structure on $x$ is a structure corresponding to a probability distribution in which all measurements are independent.

Definition: A chain structure on $x$ is a structure corresponding to a probability distribution wherein, under proper ordering of the measurements, the $k$th measurement depends on the $(k-1)$th measurement. The first measurement in the chain is unconditioned.

Definition: A tree structure on $x$ is a structure corresponding to a probability distribution wherein, under proper ordering of measurements, the $k$th measurement may depend on the $(j(k)$th measurement where $0\leqq j(k)<k$. The measurement that corresponds to the root of the tree is unconditioned.

Graphically, these structures may be expressed by directed graphs not necessarily connected. Each measurement is represented by a node in the graph, and each dependence relation is expressed by a directed edge with the arrow pointing from a measurement toward the measurement that it is dependent on. An example is shown in FIG. 2C. The edges are called links or branches of the structure. A $k$-link structure is a partial chain structure in which $k+1$ out of $n$ nodes are chained and the other nodes and independent, or isolated.

Let $c$ be the number of classes, and $a_i$ denote the $i$th class. Let $p=(p_1p_2,...p_c)$ be the *a priori* distribution of classes.

Each pattern is represented by a binary measurement vector $x=(x_1, x_2...x_n)$, $n$ being the number of measurements. Let $P(x|a_i)$ be the conditional probability of pattern $x$ given that the class is $a_i$.

Explicitly, the recognition system evaluates for the unknown pattern $x$, the following set of joint probabilities of the pattern class $a_i$ and the pattern $x$:

$$P(x,a_k)=p_kP(x|a_k) \quad (1)$$

and then selects the largest one.

Or equivalently, one can compute any monotonic function of $P(x,a_k)$, the usual one being the logarithm, namely $$\log P(x, a_k)=\log p_k+\log P(x|a_k). \quad (2)$$

The structure of the recognition system is now directly dependent upon the functional form of the conditional probability $P(x|a_k)$. Once the functional form of $P(x|a_k)$ is known, the structure of the recognition network can be derived, and the problem of designing the network reduces to the statistical estimation of the unknown parameters of the distribution.

See Chow and Liu Structure Adaptation in Pattern Recognition IEEE Transactions on Systems Science and Cybernetics, Vol SSC-2, No. 2, Dec. 1966 Pages 73—80.

FIRST-ORDER DEPENDENCE

In general, measurements are not statistically independent and there exists a certain, though usually unknown, dependence among the measurements. The central problem is to determine which dependence relations are worth examining and how to weigh them. We shall restrict ourselves to the first-order statistical dependence by assuming that in the product expansion of the probabilities each measurement may be conditioned upon, at most, one, not necessarily the immediate one, of the preceding measurements; namely, $$P(x,a_k)=p_k \prod_{i=1}^{n} P(x_i x_{j(i)}, a_k) \quad (3)$$

with $0 \leq j(i) < i$.

The index set $[j(i)]$ defines a directed tree. By definition $j(i)=0$ indicates that $x_i$ is not conditioned. As a special case, when $j(i)=i-1$ the tree of dependence becomes a chain, and the product expansion of (3) reduces to the Markov chain expansion.

The recognition problem, in this case, is to evaluate $T(x,a_k)=\log[p_k p(x|a_k)]=$ $$b(k)+\sum_{i=1}^{n} w_1'(i,k)x_i+\sum_{i=2}^{n} w_1''(i,k)x_{j(i)}+\sum_{i=2}^{n} w_2(i,k)x_i \cdot x_{j(i)} \quad (4)$$

Then evaluate this equation for each class and seek the maximum to identify the pattern.

A probability distribution, as any other function, can be approximated by a number of different procedures. Here we consider the problem of best approximating an $n$th order distribution by a product of $n-1$ second order distributions or cross products.

In order to discuss the goodness of approximation of an $n$th order distribution of features, the notion of closeness of approximation must be first defined. Let $P(x)$ and $P_a(x)$ be two probability distributions of $n$ discrete variables $x=(x_1, x_2 \ldots x_n)$. The following equation defines closeness of approximation:

$$I(P,P_a)=\sum_{x} P(x) \log \frac{P(x)}{P_a(x)} \quad (5)$$

The mutual information $I(x_i, x_j)$ between two variables $x_i$ and $x_j$ is given by $$I(x_i,x_j)=\sum_{x_i,x_j} P(x_i,x_j) \log \frac{P(x_i,x_j)}{P(x_i)\,P(x_j)}$$

This is the usual definition of mutual information. It is well known that $I(x_i, x_j)$ is nonnegative.

In the graphical representation of dependence relations, to every branch of the dependence tree we assign a branch weight $I(x_i, x_{j(i)})$. Given a dependence tree $t$, the sum of all branch weights is a useful quantity.

A probability distribution of tree dependence, $P_t(x)$, is an optimum approximation to $P(x)$, if and only if, the sum of the branch weights in the dependence tree is maximum.

By virtue of this result, our minimization problem can be solved without exhaustively considering all possible expansions. Furthermore, the solution is achieved without requiring any knowledge of the actual higher order distribution other than that is necessary to evaluate the mutual information between pairs of variables. The second order component distributions suffice for this purpose.

A direct solution is possible because the problem of finding the optimal first order dependence tree is transformed to that of maximizing the total branch weight of a dependence tree. Since the branch weights are additive, the maximum weight dependence tree can thus be constructed branch by branch. A procedure to best approximate an $n$th order distribution by a second order product expansion is described in the following section.

In applications, the probability distribution is frequently not explicitly given and only samples are available. It is necessary to construct a distribution from the samples. This situation is typical in most pattern recognition problems. To achieve a second order product approximation, the dependence tree, in addition to the parameters, must be estimated.

A standard estimation procedure may be employed to obtain an estimated value of the sample mutual information $\hat{I}(x_i, x_j)$.

Then take $\hat{I}(x_i, x_j)$ as $I(x_i, x_j)$ and use the optimization procedure to obtain a tree such that the tree sum of mutual information $$\sum_{i=1}^{n} \hat{I}(x_i,x_{j(i)})$$

is maximized.

The procedure minimizes the sample value of the closeness of approximation. The procedure also maximizes the likelihood function and is a maximum likelihood estimator for the dependence tree. The consistency property of maximum likelihood estimates also holds for our case. In consequence, if the underlying distribution is of tree dependence, then the tree rendered by the present procedure converges with probability one to the true tree of dependence.

SUMMARY OF THE INVENTION

An object of this invention is to provide a pattern recognition system capable of adaptively forming a structure for pattern recognition.

Another object of this invention is to provide an optimal structure in an adaptive system.

Still another object is to employ an adaptive system which will provide a statistical structural relationship among a plurality of features employing a directed graph form of statistical structural relationship.

In addition an object of this invention is to provide a structure which is optimal based on tree dependence including the second order or pair combinations of pattern features.

A specific object of this invention is to provide a structure with $n-1$ optimally related limbs of mutual information selected for a tree when there are $n$ features being provided to the pattern analyzing system.

Still another object of this invention is to provide means for weighting the outputs of the tree-structured, logically controlled information handling system.

In accordance with this invention, means are provided for analyzing the mutual information relative to a pattern being analyzed which is statistically manifested by pairs of features extracting device outputs.

Means is then provided for measuring the relative amplitudes of such mutual information values and forming a directed network for each of a plurality of adaptive recognition networks.

Finally means is provided for passing information as to pairs of features through the network, and that plus feature data through summing networks, adjusted in accordance with the particular directed network selected.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 2A is a chart indicating the value of all of the combinations of mutual information calculated for a particular group of samples of a given pattern, indicating the order of selection of pairs of mutual information according to amplitude.

FIG. 2B is a chart of the limbs formed between the six features being examined by the system for order of mutual information without forming closed loops.

FIG. 2C shows the directed line form of graph for the dependence tree formed in FIGS. 2A and 2B by the system.

DESCRIPTION OF THE PREFERRED EMBODIMENT

Figure 1A:
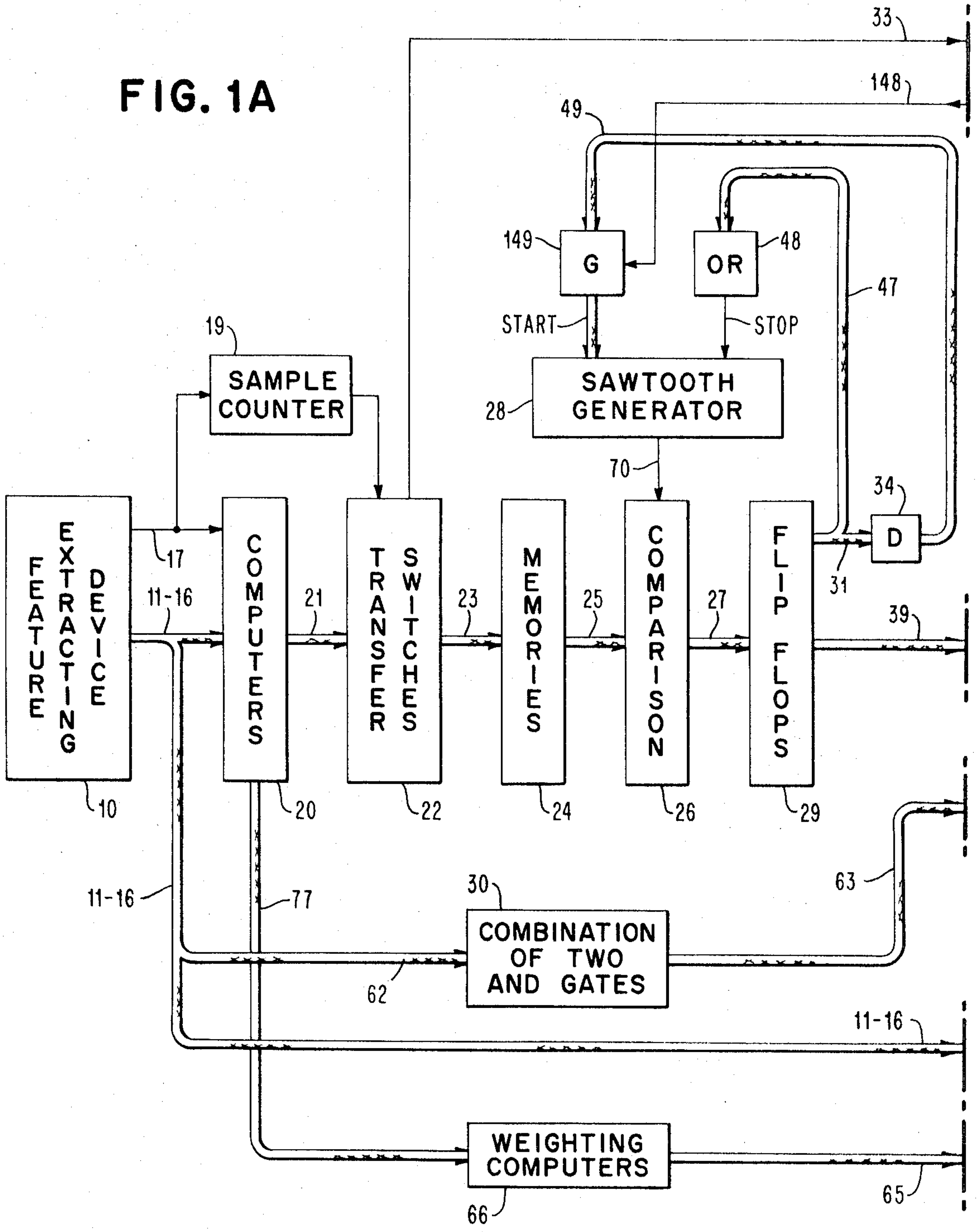
FIG. 1 shows the arrangement of FIGS. 1A and 1B which contain a schematic diagram of an adaptive pattern recognition system operating in accordance with the invention.
Figure 1:
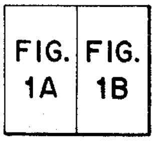
Figure 1B:
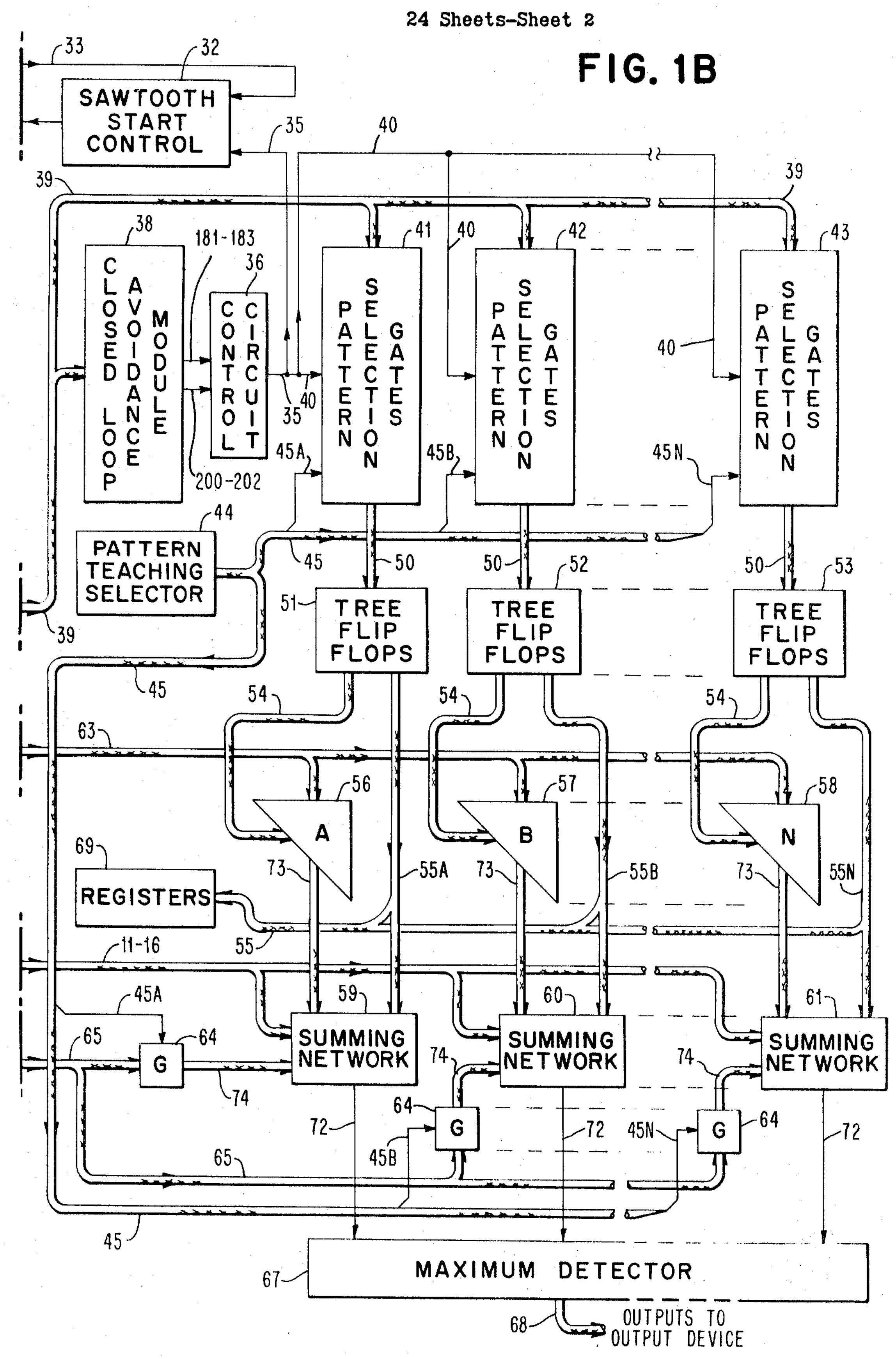

Referring to FIG. 1, a feature extraction device 10 provides a principal output on six lines 11—16 which connect to analogue computers 20, to combination of two AND gates 30 and to summing networks 59, 60 and 61. An additional output from the feature extraction device 10 is provided by line 17 to 15 separate analogue computers 20 and a sample counter 19. The feature extraction device 10 may comprise any means which provides a plurality of meaningful outputs relative to each of a plurality of pattern samples. It encompasses well-known pattern recognition feature extraction devices which combine outputs of a plurality of sensors in a predetermined fashion determined to be advantageous either on an empirical or a theoretical basis. The 15 analogue computers 20 provide 15 independent outputs on 15 independent lines 21 which are connected through 15 of 16 independent transfer switches 22 and through 15 independent lines 23 to 15 memories 24 so that each analogue computer 20 will transfer to its associated memory 24 the output it is yielding upon actuation of the transfer switches 22.

The preset sample counter 19 provides an output after N preselected samples have been processed by the feature extraction device. For example, 1000 samples of a pattern such as a set of fingerprints, a set of aircraft silhouettes or a set of characters might be processed by the feature extraction device. Upon completion of extraction of the 1000th feature, the sample counter, if present to 1000, will provide an output closing the transfer switches 22 for a sufficient time to transfer outputs to the memory circuits 24. Memory circuits 24 are analogue devices such as capacitors which can retain a preset voltage until discharged by a switching device such as a transistor operated by a reset input.

The 15 outputs of the memory circuits 24 are connected by lines 25 to 15 corresponding comparison circuits 26 which may comprise differential amplifiers, which are adapted to be swept by a ramp or sawtooth voltage from a sawtooth generator 28 for comparing the outputs of the various memories. The largest output value from a memory 24 will produce the first positive output from a comparison circuit 26 which will be connected by a line 27 to the associated flip-flop 29. As soon as a flip-flop 29 is triggered, then the sawtooth generator 28 will be stopped by a signal on lines 31 and 47.

The sawtooth generator 28 is initially started by closing gate 149 when triggered by a control 32 after the control is reset by a 16th one of the transfer switches 22 via line 33. Upon receipt of a signal from the line 31 through a delay circuit 34, through line 49 and gate 149, the sawtooth will be restarted, unless there have been more than a predetermined number of inputs received on line 35 from an EXCLUSIVE OR and control circuit 36 connected to the output lines 181—183 and 200—202 of a closed loop avoidance module 38.

The closed loop avoidance module 38 is connected to the 1 outputs of the 15 selection flip-flops 29 by lines 39. This circuit is employed to assure that the mutual information combinations of two features selected for a pattern tree do not form what may be referred to as a closed loop. For example, three particular features should not be connected together by the three possible combinations thereof taken two at a time, regardless of order. If a tree forming a closed loop were employed, then the reliability of the pattern recognition system would be less than optimum based upon a theoretical approach sustained by empirical data.

Accordingly, the value selected, if it does not form a closed loop will provide an output from the EXCLUSIVE OR and control circuit 36 which will be presented on lines 35 and 40. Lines 40 are connected to a plurality of pattern selection gates 41, 42, 43 all of which are connected to the outputs 39 of the comparison flip-flops 29 and which gates are operated serially by the pattern teaching selector 44 by connections via lines 45, and 45A, 45B ... or 45N.

There is need for a plurality of pattern selection gates 41, 42, 43 because one is required for each pattern class which is to be analyzed by the system. During initial operation of the system, when the system is being taught what is the appropriate tree structure and the proper weighting for a class of pattern information to be processed, a particular one of these gates is operated by the pattern teaching selector 44. The pattern selection gates 41, 42, 43 are thus but a few of a plurality of such gates, which are shown for convenience of illustration.

To the output lines 50 of the pattern selection gates 41, 42, 43 are connected the pattern selection of tree flip-flops 51, 52 and 53, inter alia, which will record the tree selected by the preceding circuits for a particular pattern, during the teaching phase while any one of the associated pattern selection gates 41, 42, or 43 was operative under the control of the pattern teaching selector. Each of the sets of tree configuration flip-flops 51, 52 and 53 has two sets of outputs on lines 54 and 55A, 55B or 55N. Outputs on lines 54 are connected to control the corresponding set of recognition AND gates 56, 57 and 58 respectively. Outputs on lines 55A, 55B or 55N are connected to summing networks A, B and N, 59, 60, and 61.

The recognition gates 56, 57 and 58 perform the function, during operation of the system subsequent to the teaching or tree selection phase, of passing signals from the combination of two AND gates 30 through lines 63 and out through lines 79 to the respective summing networks 59, 60, and 61.

The summing networks are also taught or adjusted to provide the proper weighting to the various "branches" of the tree selected so that the probability of correct pattern identification will be enhanced. Lines 65 to a set of pattern teaching selector control gates 64 are connected to the output lines 65 of a plurality of weighting computers, which are connected to a plurality of lines 77 from the analogue computers 20. Control gates 64 connect cables 65 individually to cables 74 to the summing networks 59, 60, 61 upon operation of a line 45A, 45B, or 45N.

Thus, during the training phase, the various summing networks are adjusted. During operation in the recognition mode, the combinations of two features selected by the tree structure and recorded in the tree flip-flops can be summed based upon their relative weights. Input lines 11—16 also extend to the summing network and will pass through separate weighing circuits adjusted for the first order values of the six features being analyzed.

Then a maximum detector circuit 67 (which may resemble the comparison circuit 26 in structure) will select and identify the largest output from the summing networks 59, 60 and 61. Such information is then passed to an output device such as a typewriter, chart recorder, etc., via line 68. Alternatively, if desired, the tree structure can be read out of the tree configuration flip-flops via lines 55 into registers 69 for use in recording the tree selection pattern.

Referring to the FIGS. 3A—3K, we see 15 analogue computers 20 connected to the seven input lines 11—17 for connecting six sets of feature readings $X_1$ to $X_6$ and a specimen bit line 17 to the system. There are 15 combinations of $X_i$ and $X_j$ for $i<j$ and $1\leq i\leq n-1$ where $n=6$, i.e., $n-1\leq 5$ and $2\leq j\leq n$ where $n=6$. Thus, all 15 combinations of the sets of inputs taken two at a time are derived, i.e., for $$C_2^6 = \frac{6\times 5}{1\times 2} = \frac{30}{2} = 15$$

Each computer then calculates the mutual information in accordance with the statistical formula·

$$I(X_i, X_j) = \sum_{X_iX_j} P(X_iX_j) \log \frac{P(X_i, X_j)}{P(X_i)P(X_j)}$$

This is translated in specific terms into a formula for binary values of any two signals being considered; which is as follows:

$$I_{ij} = \frac{N_{00}}{N} \log \frac{N_{00}N}{N_{i0}N_{j0}} + \frac{N_{01}}{N} \log \frac{N_{01}N}{N_{i0}N_{j1}} + \frac{N_{10}}{N} \log \frac{N_{10}N}{N_{i1}N_{j0}} + \frac{N_{11}}{N} \log \frac{N_{11}N}{N_{i1}N_{j1}}$$

where $N_{i0}$ means the number of samples where $X_i=0$;
$N_{i1}$ means the number of samples where $X_i=1$;
$N_{j0}$ means the number of samples where $X_j=0$;
$N_{j1}$ means the number of samples where $X_j=1$;
$N_{00}$ means the number of samples where $X_i=0$ and $X_j=0$;
$N_{01}$ means the number of samples where $X_i=0$ and $X_j=1$;
$N_{10}$ means the number of samples where $X_i=1$ and $X_j=0$;
and $N_{11}$ means the number of samples where $X_i=1$ and $X_j=1$.

ANALOGUE INFORMATION COMPUTERS

Figure 4A:
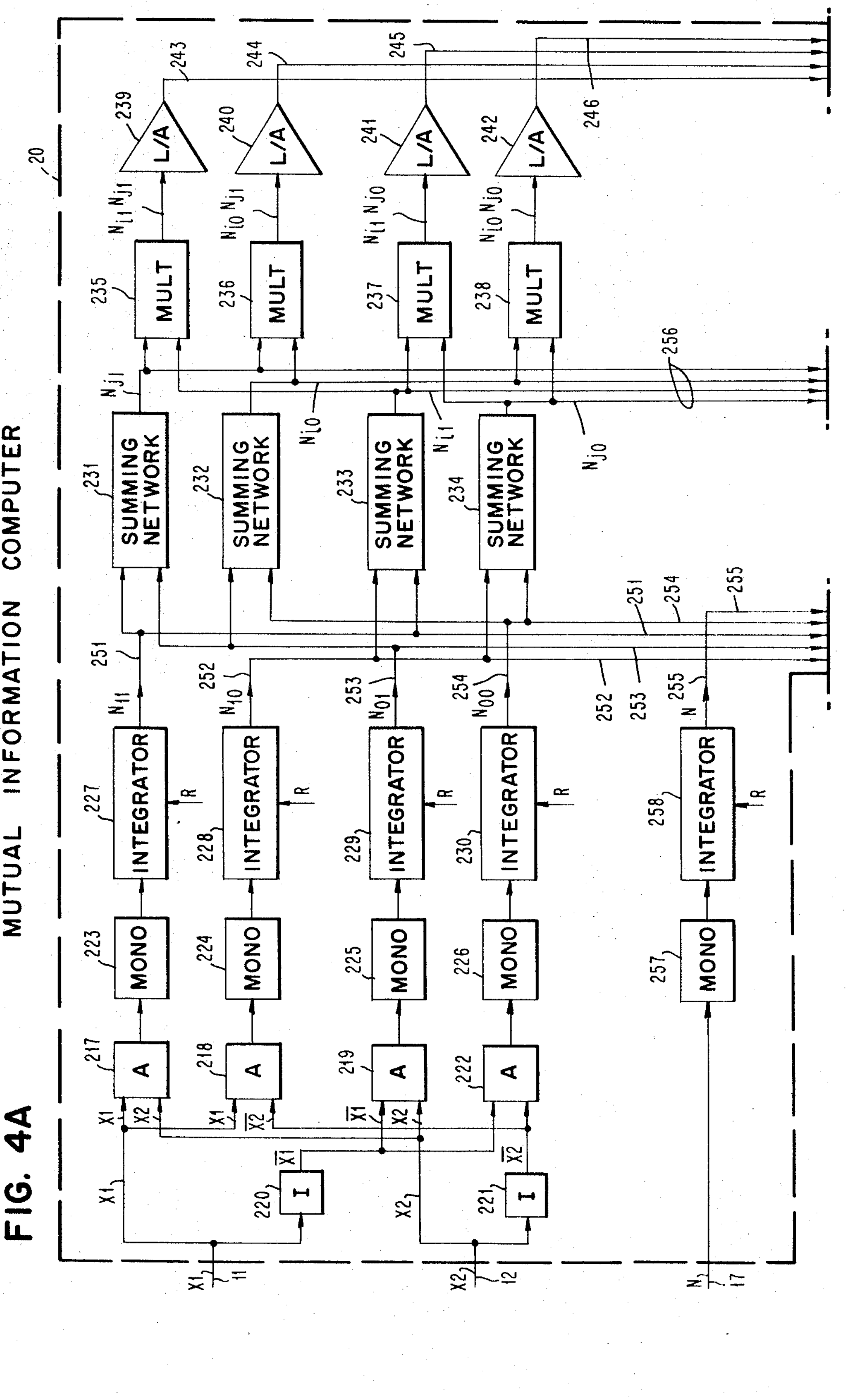
FIGS. 4, 4A and 4B show one of the mutual information analogue computer for $x_i=x_1$ and $x_j=x_2$.
Figures 4, 4B:
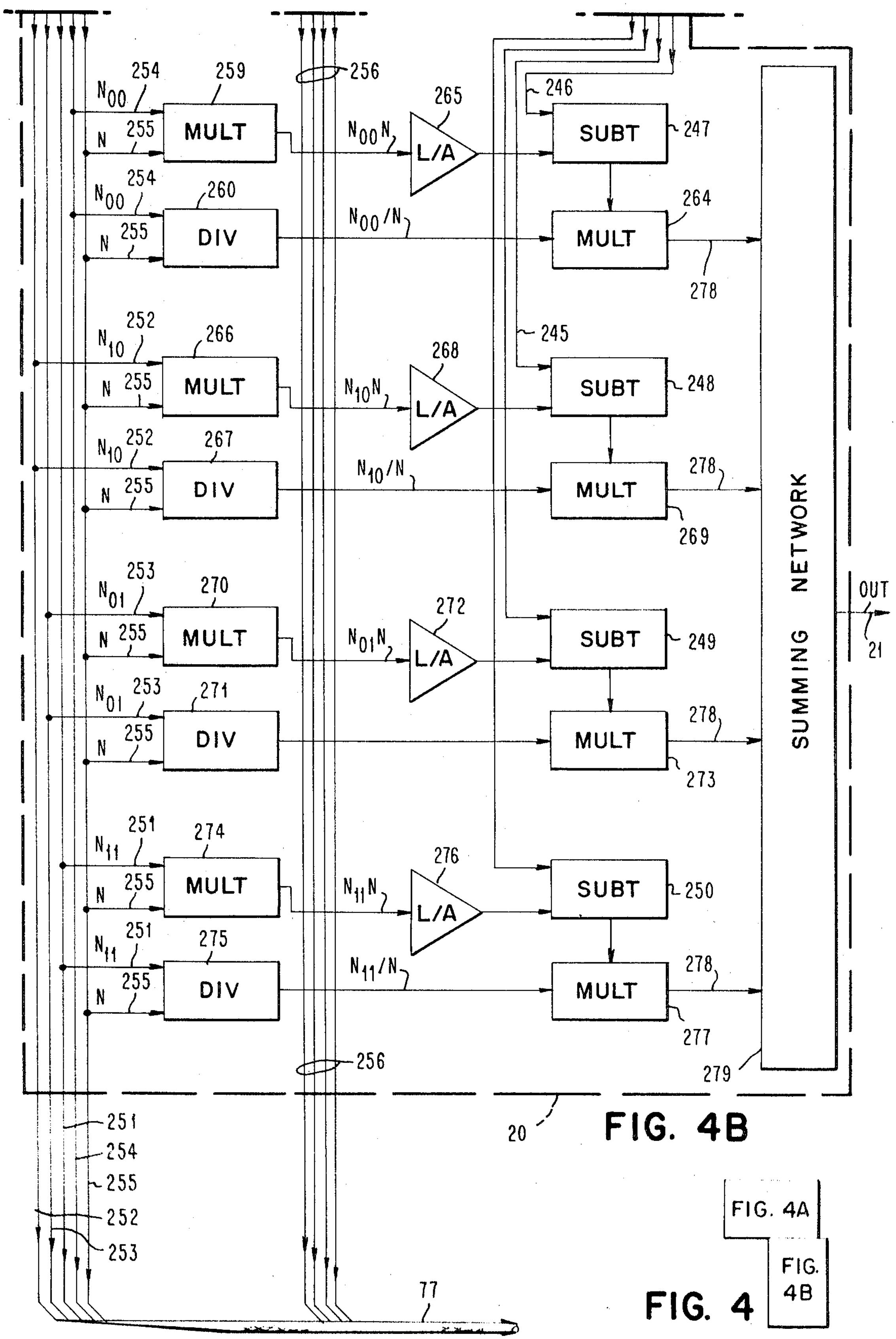

Referring to FIGS. 4A and 4B, one of the 15 analogue computers 20 is shown for calculating the mutual information contained in the $X_1$ and $X_2$ features of the N samples presented to the feature extraction device. In addition, the summations of $N_{ij}$ are calculated, i.e., $N_{00}$ which is the number of times $X_1$ and $X_2$ are zero, $N_{01}$, which is the number of times $X_1$ is zero and $X_2$ is 1; $N_{10}$, $X_1=1$ and $X_2=0$, and $N_{11}$ with $X_1=1$ and $X_2=1$, for transfer to cable 77 as are the values of $N_{j1}$, $N_{i0}$, $N_{j0}$ and $N_{i1}$. The inputs $X_1$ and $X_2$ are connected directly from lines 11 and 12 respectively to AND gate 217. Input $X_1$ is connected to AND gate 218 also. Input $X_1$ is also connected to an inverter 220 to form it complement $\overline{X_1}$ which is connected to the inputs of AND gates 219 and 222. Input $X_2$ is also connected to AND gate 219 and to an inverter 221 to form its complement $\overline{X_2}$ which is connected to the inputs of AND gates 218 and 222. The outputs of the four AND gates 217, 218, 219 and 222 are respectively connected through monostable circuits 223, 224, 225 and 226 respectively to integrators 227, 228, 229 and 230 respectively and having output lines 251, 252, 253, and 254 carrying the sums of $N_{11}$, $N_{10}$, $N_{01}$, and $N_{00}$ which are the relative totals of positive pulses received on those lines. The monostable devices provide short duration pulses to charge the capacitors in the integrators by substantially equivalent amounts for each pulse received from the AND gates.

Then the sums for $N_{j0}$, $N_{j1}$, $N_{i0}$ and $N_{i1}$ are formed as follows:

$N_{j-1}=N_{01}+N_{11}$ for $i=0$ or $1, j=1$
$N_{j-0}=N_{00}+N_{10}$ for $i=0$ or $1, j=0$
$N_{i-0}=N_{01}+N_{00}$ for $i=0, j=0$ or $1$
$N_{i-1}=N_{10}+N_{11}$ for $i=1, j=0$ or $1$ The summing networks 231, 232, 233, and 234 form the above sums respectively by means of an operational adder of the kind shown on page 16 of the Design and Use of Electronic Analogue Computers, C. P. Gilbert, Chapman and Hall, Ltd., 1964, hereinafter referred to as the Gilbert text.

The outputs of 256 of the summing networks are then connected to the multipliers 235, 236, 237, and 238 which provide the four products $N_{i1}N_{j1}$, $N_{i0}N_{j1}$; $N_{i1}N_{j0}$; and $N_{i0}N_{j0}$ respectively to logarithmic amplifiers 239, 240, 241 and 242. These values are passed via lines 243, 244, 245 and 246 to subtraction circuits 247, 248, 249 and 250. The multipliers employed may be electrodynamic or servo driven potentiometric varieties inter alia as described in the Gilbert text at pages 312 and 315. The subtraction circuits 247—250 are two input circuits connected across equal loads to ground, thereby presenting the potential difference therebetween across high impedance circuits to the output. An input line 17 supplies a pulse to a monostable circuit 257 connected to drive another integrator 258 for accumulating a total or integrated analogue value on line 255 corresponding to the number of pulses received from sample input line 17 for counting the N samples of the predetermined pattern being analyzed.

A multiplier 259 and a divider 260 are connected to provide the product and dividend of $N_{00}$ and N from lines 254 and 255 respectively which multiplication product passes as $N_{00}N$ to logarithmic amplifier 265 and thence to subtraction circuit 247 whose output and the output of divider 260 are connected to multiplier 264.

Similarly, multiplier 266 and divider 267 receive $N_{10}$ and N on lines 252 and 255 to pass $N_{10}N$ to log amplifier 268 and thence to subtracter 248 and thence to be multiplied by $N_{10}/N$ in multiplier 269.

Lines 253 and 255, multiplier 270 and divider 271, logarithmic amplifier 272, subtracter 249 and multiplier 273 cooperate analogously. Similarly, lines 251 and 255, multiplier 274, divider 275, logarithmic amplifier 276, subtracter 250 and multiplier 277 cooperate. The outputs of multipliers 264, 269, 273 and 277 on lines 278 pass to summing network 279 where the instantaneous value of mutual information is yielded on output line 21. Lines 256 pass to output cable 77 which connects to the weighting computers 66.

The five integrators 227—230 and 258 may be reset with the entire teaching system by reset line R which may be operated concurrently with shifting of the pattern selector.

MAXIMUM DETECTORS

Figure 3A:
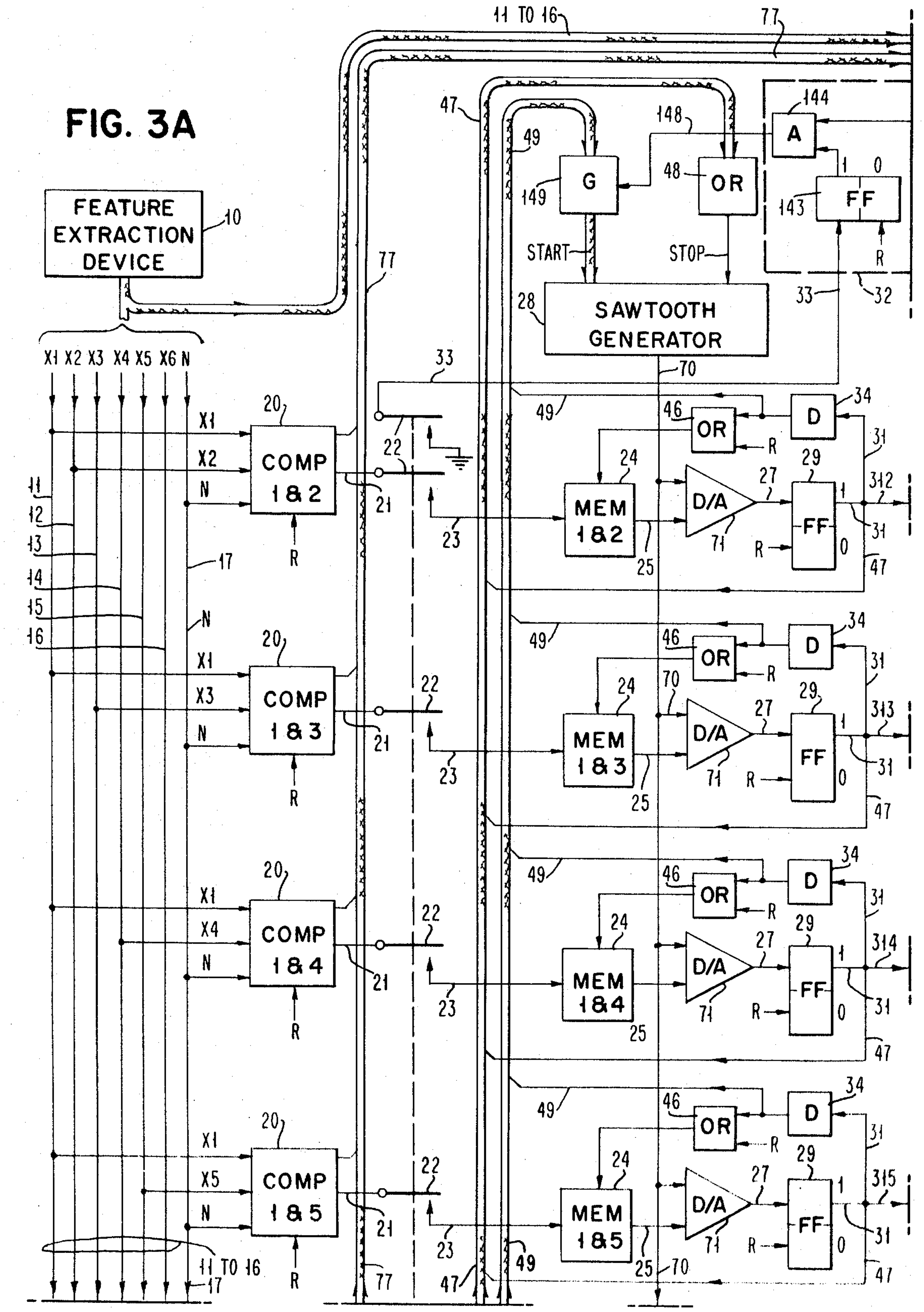
FIGS. 3, 3A—3K show further details of construction of the system shown in FIG. 1.
Figure 3B:
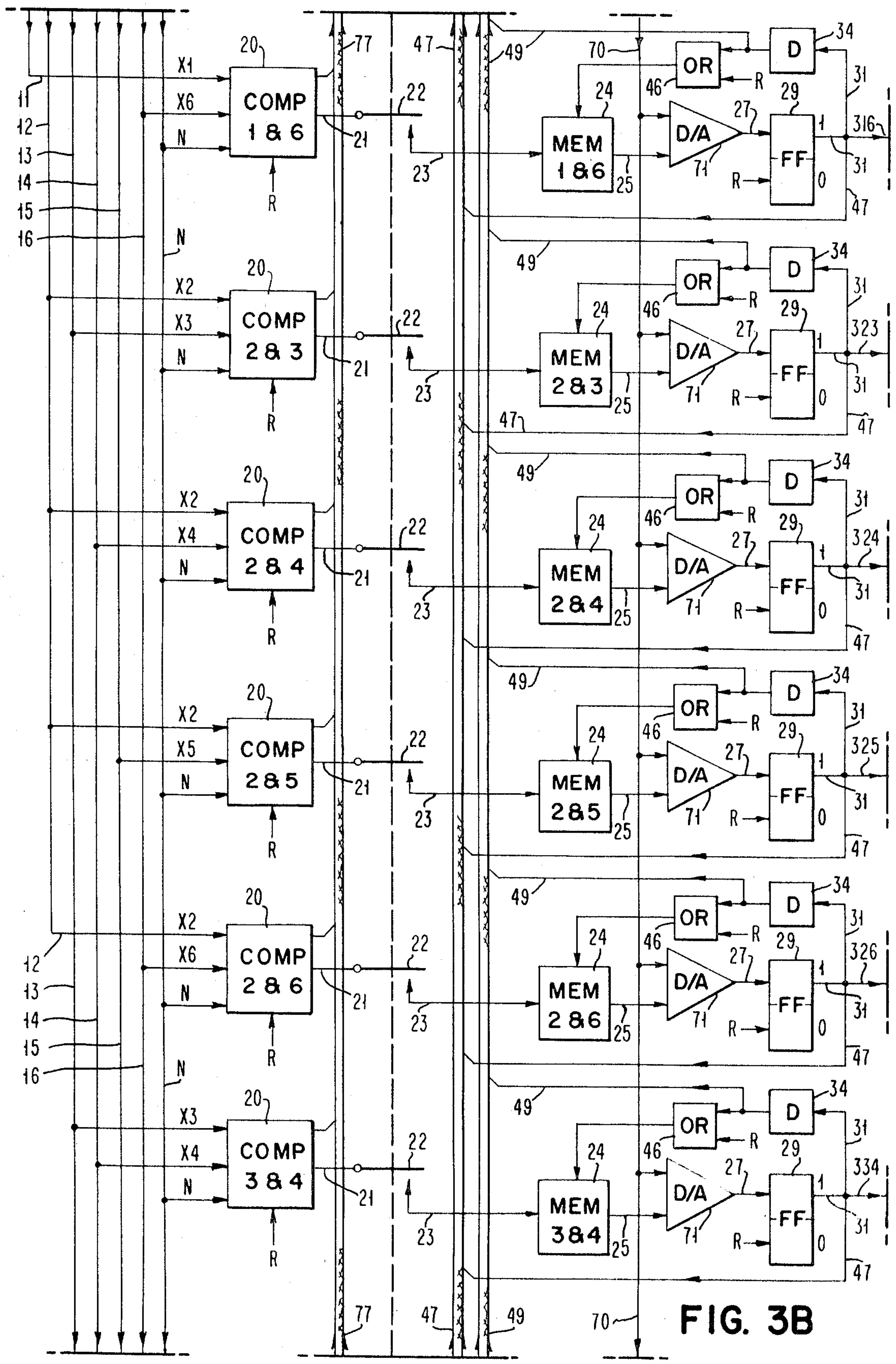
Figures 3, 3C:
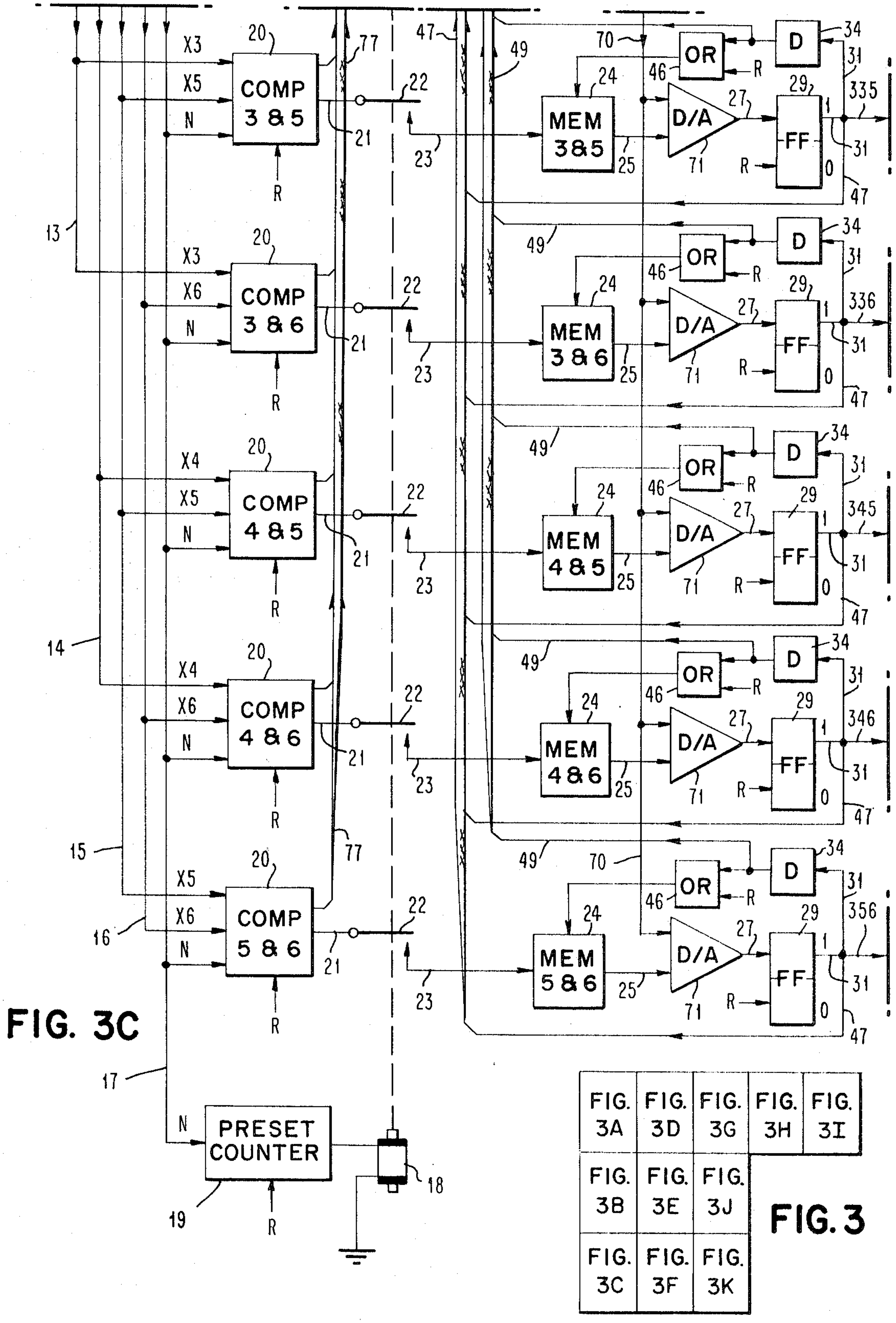
Figure 3D:
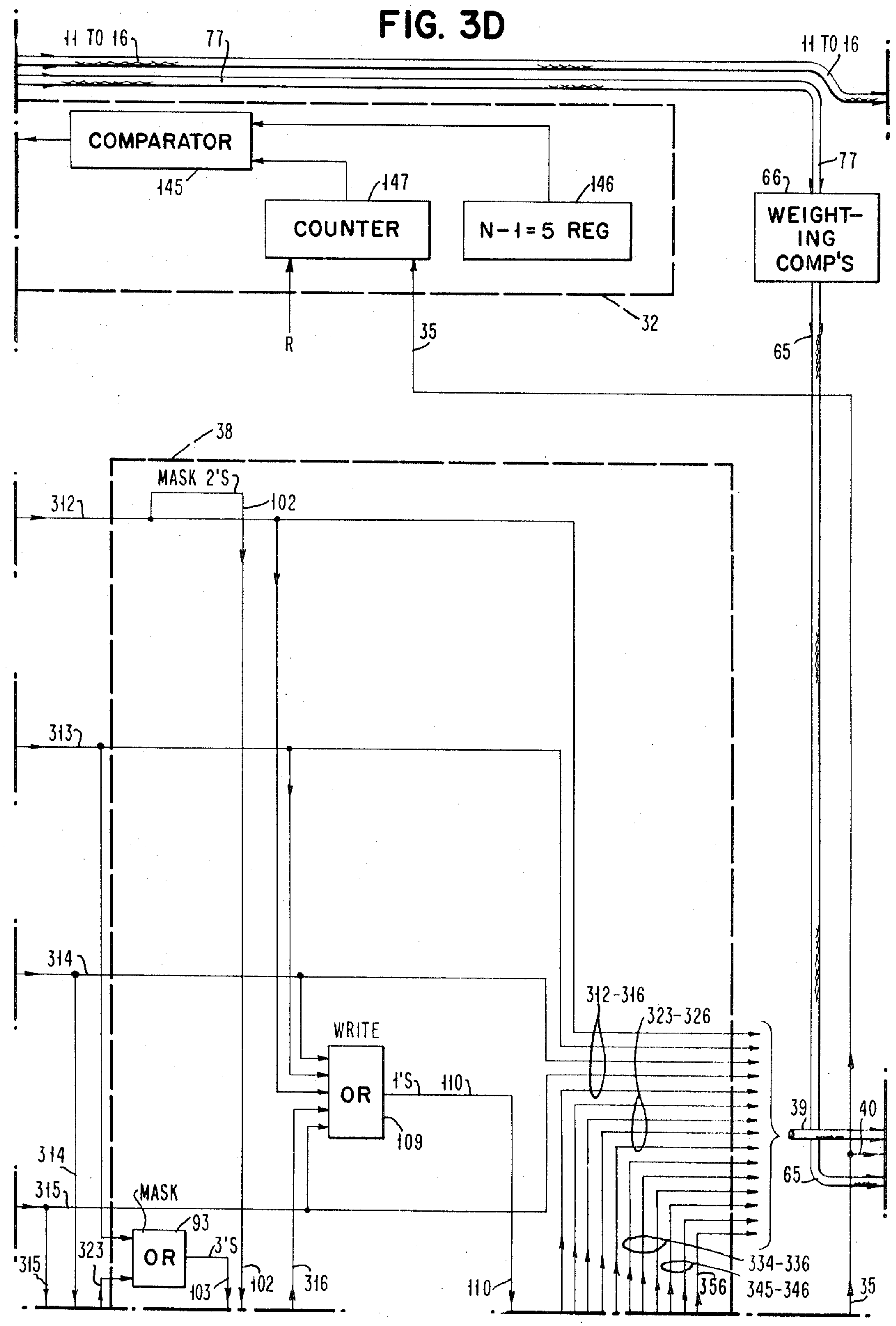
Figure 3E:
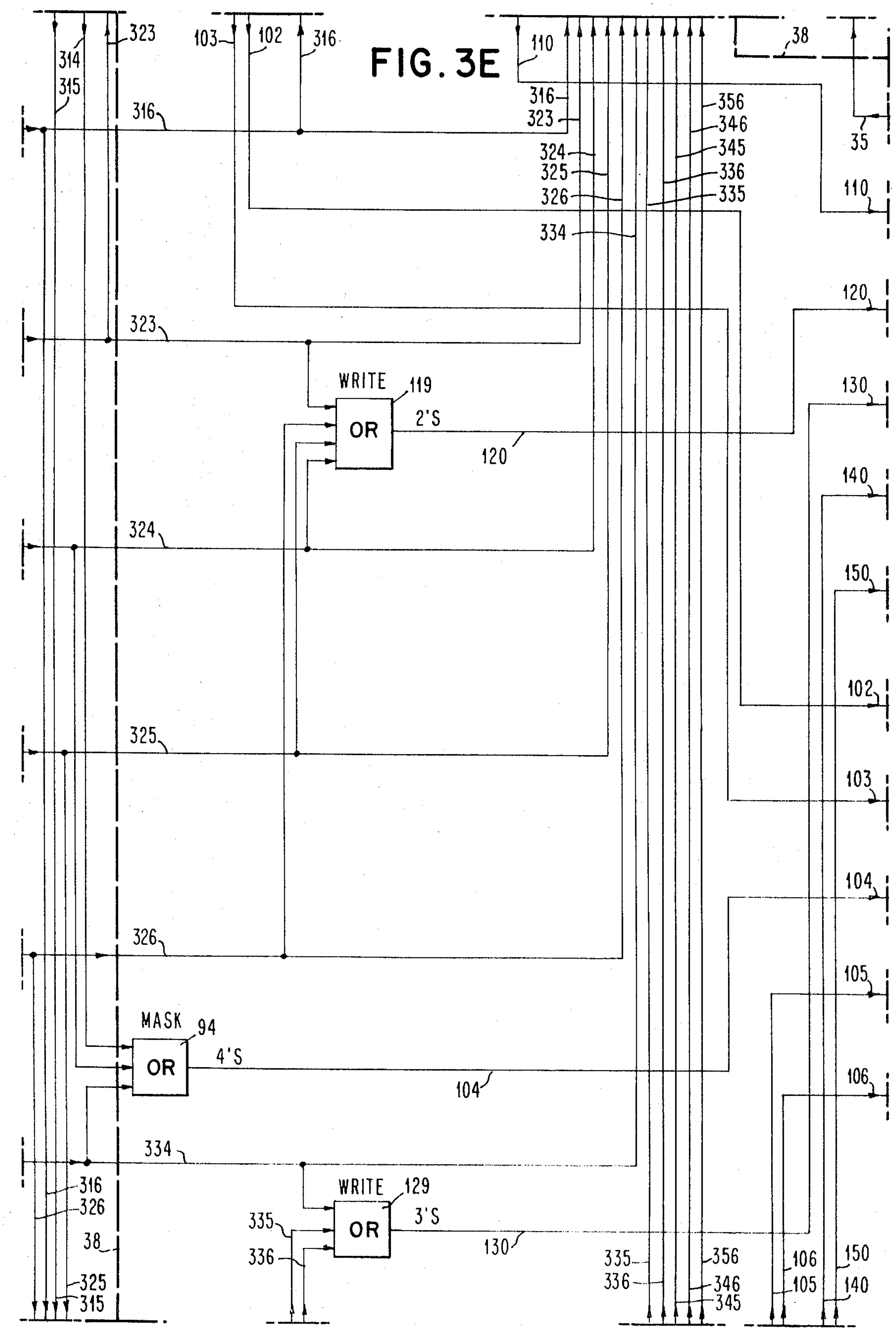
Figure 3F:
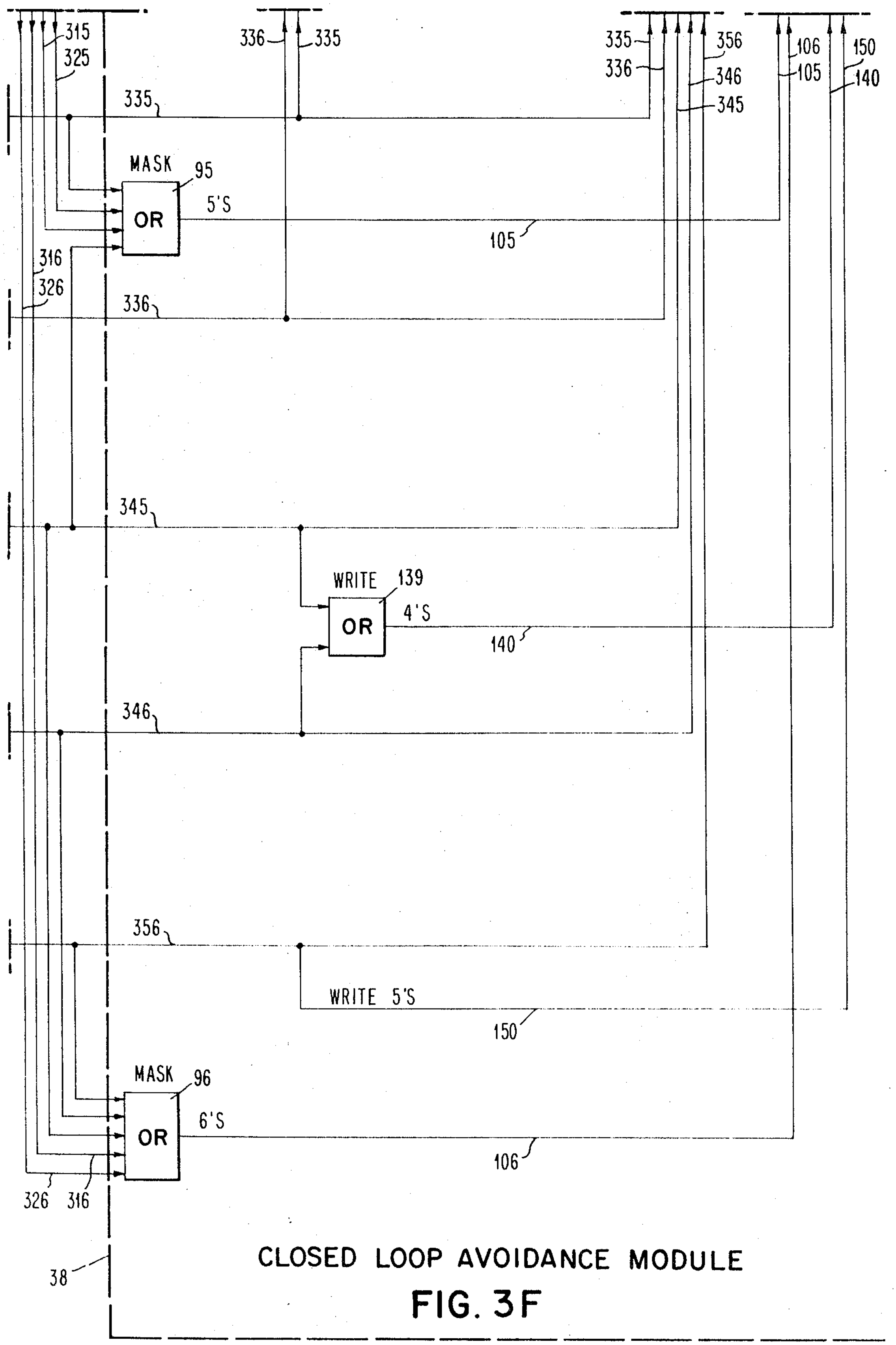
Figure 3G:
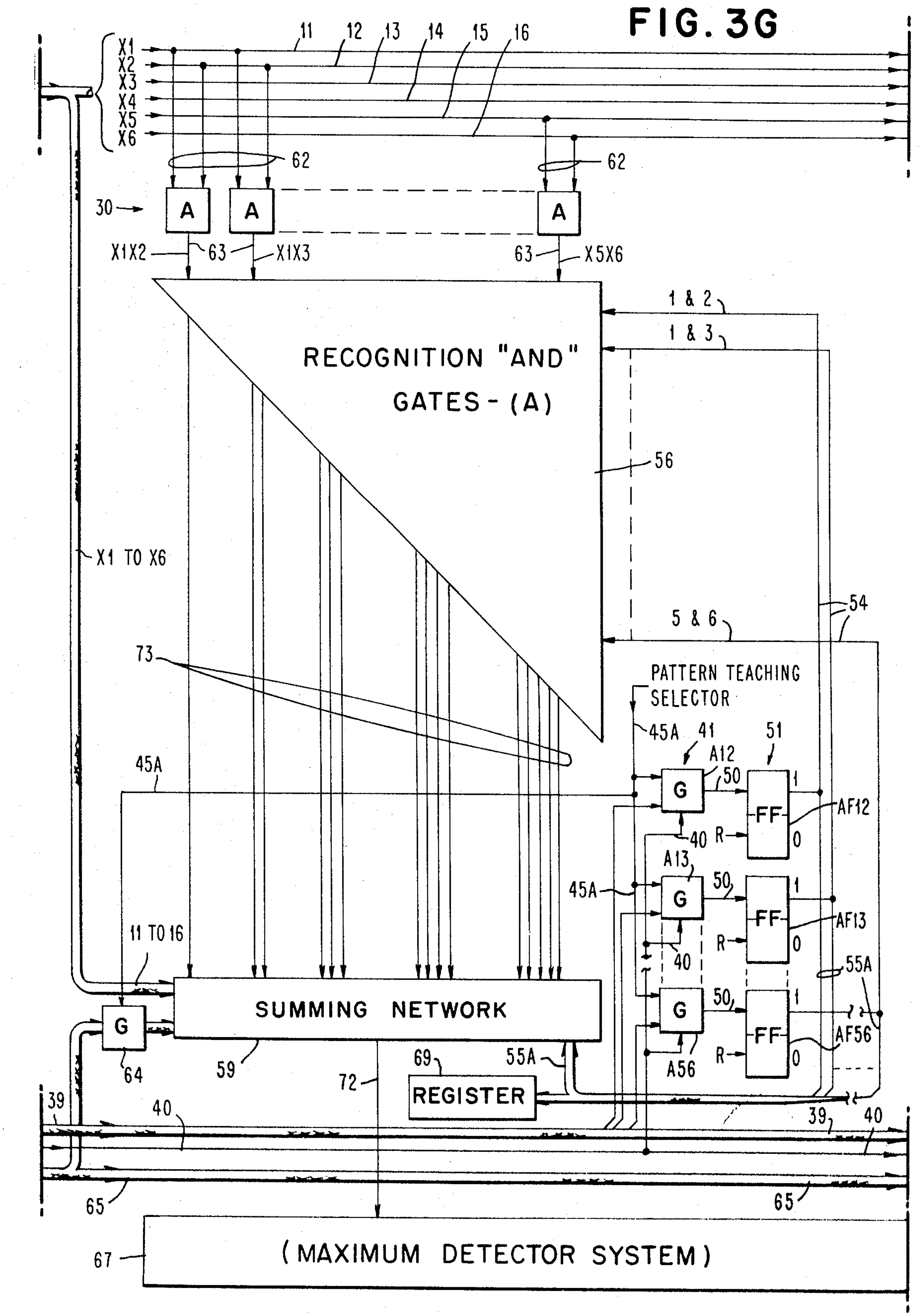
Figure 3H:
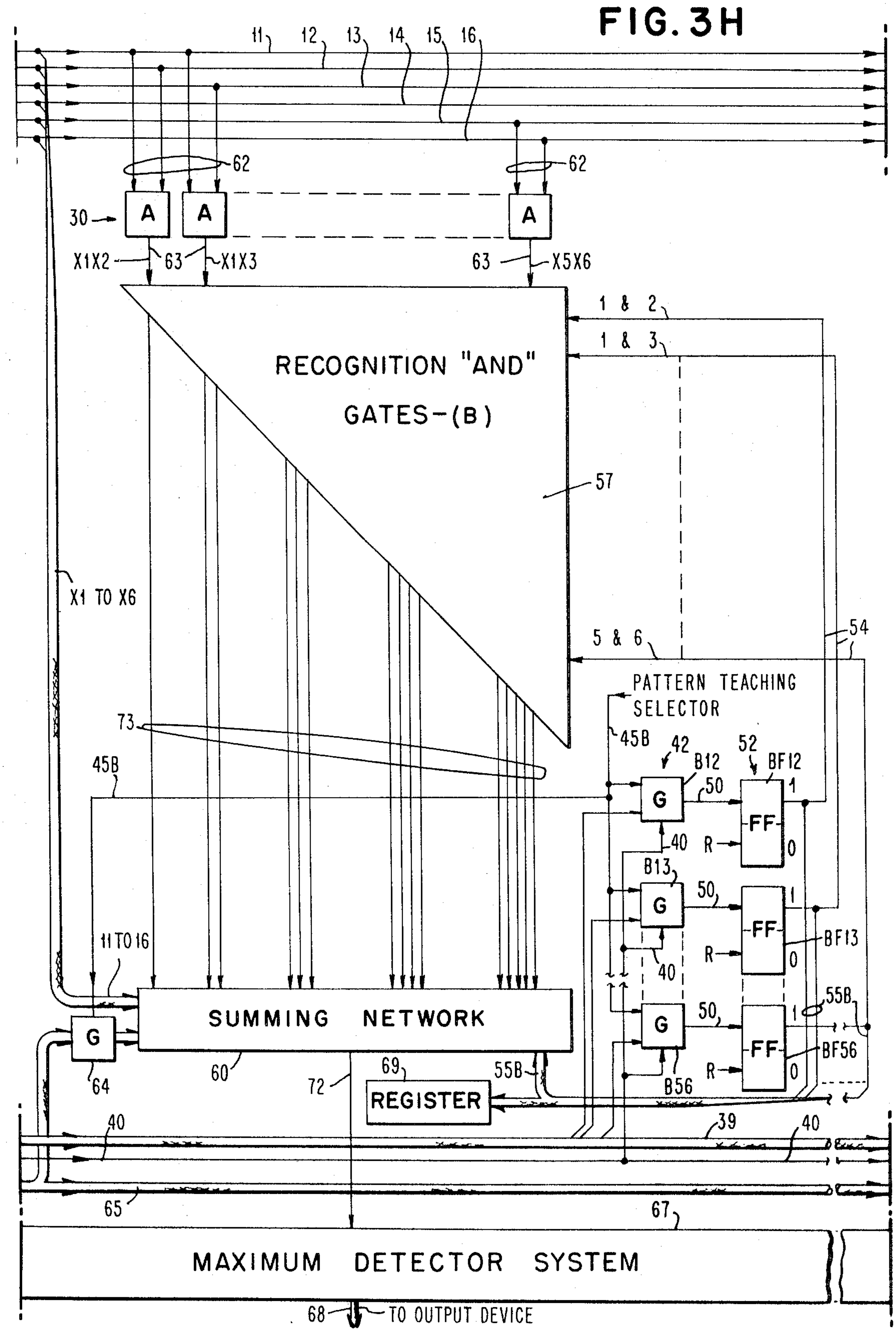
Figure 3I:
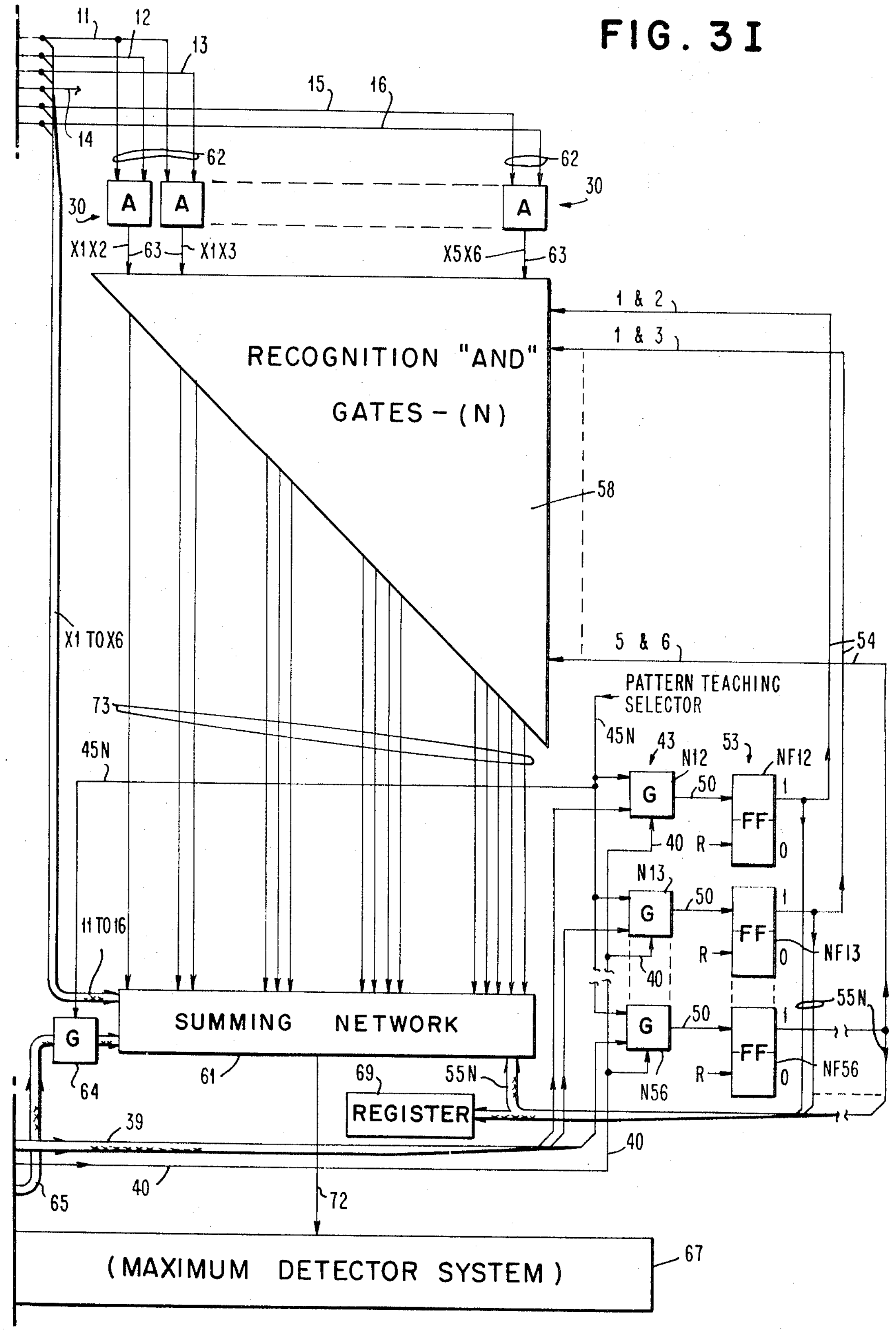
Figure 3J:
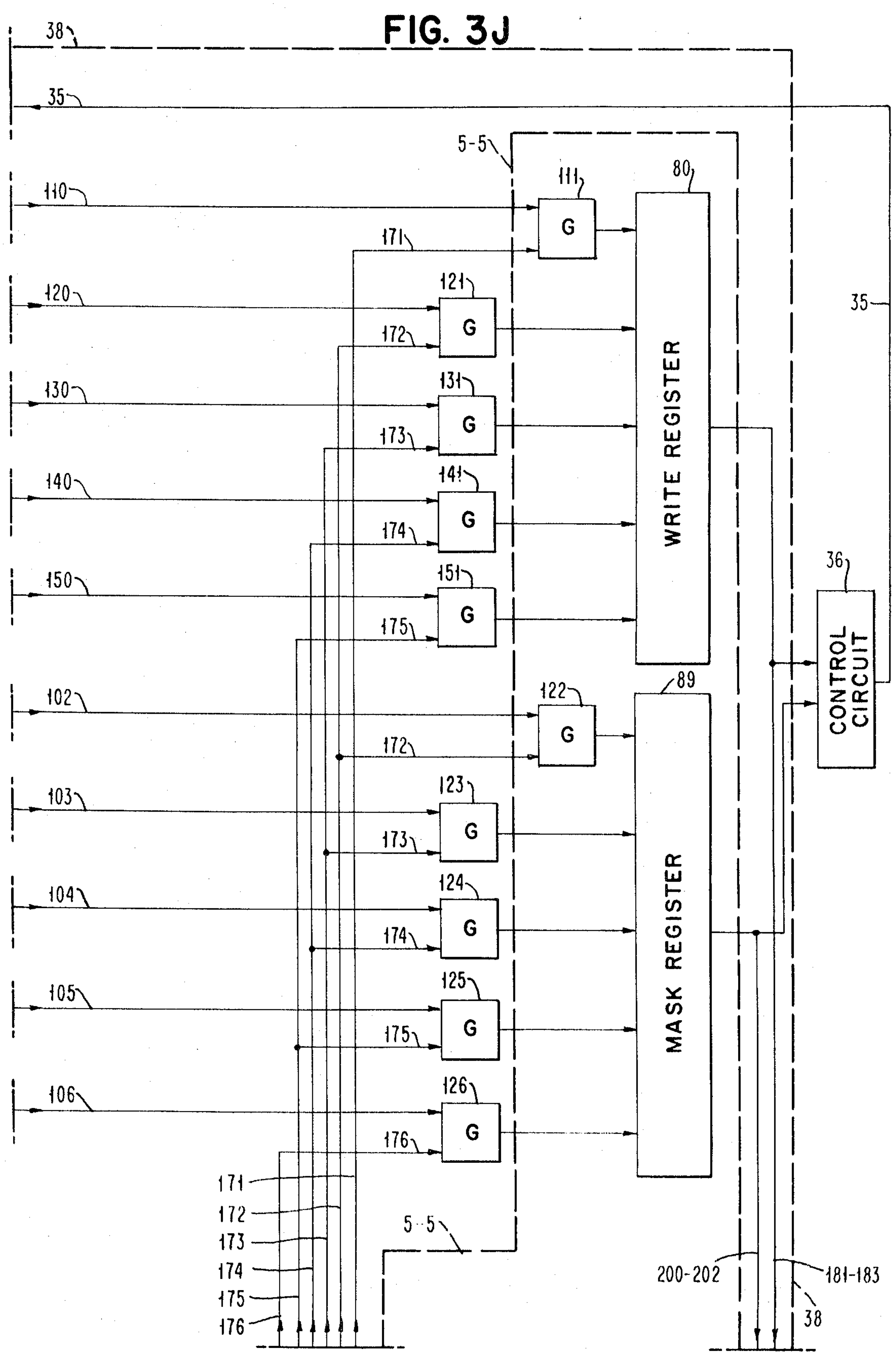
Figure 3K:
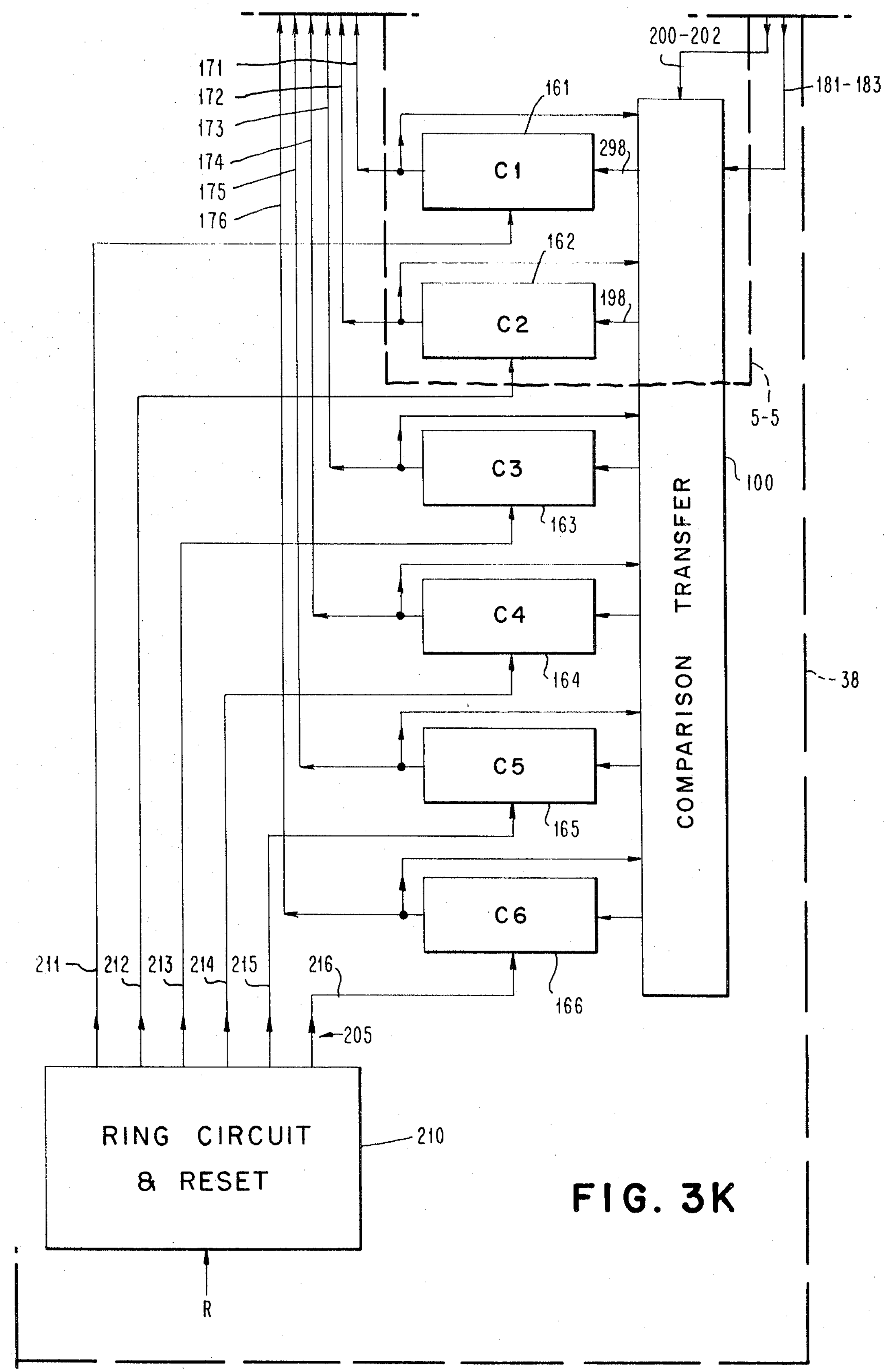

Referring to FIGS. 3A—3K, and in particular FIGS. 3A—3C for the moment, the outputs of the 15 computers 20 are provided to the arms of relay blades 22 of relay 18. Relay 18 is controlled by a preset sample counter 19, which when a predetermined number of inputs N has been received on line 17 and after a slight time delay causes relay 18 to close blades 22 onto contacts to lines 23 which transfer the outputs of the computers 20 at that time to the 15 memory circuits 24 for values of $X_1X_2$, $X_1X_3$ ... $X_5X_6$.

A sawtooth generator circuit 28 has an output line 70 connected in opposition with each of the output lines 25 of the memory circuits 24 to the inputs of 15 differential amplifiers 71 corresponding to comparison circuit 26. Upon reaching a predetermined value, the output line 27 of a particular differential amplifier to which its memory circuit carries the largest mutual information memory value will provide an output. This output will trigger a flip-flop 29 whose output 31 is connected via line and cable 47 through OR circuit 48 to stop the sawtooth generator. The sawtooth generator 28 should stop for a predetermined period of time sufficient for the subsequent logic including the closed loop avoidance module 38 to operate and determine whether a closed loop would be produced if the provisionally selected mutual information feature were permanently selected by the pattern teaching system and recorded in the tree configuration flip-flops 51, 52, ... 53. This delay in restarting is afforded by each of a plurality of delay circuits 34 connected by line 49 and cable 49 and gate 149 to restart the sawtooth generator 28, so long as a "positive" output is received by gate 149 on line 148 from sawtooth start control circuit 32. The latter control circuit will be described below in greater detail.

If there were no change in the previously selected memory circuit 24, manifestly its flip-flop 29 would be triggered once more. Accordingly, each line 49 is connected to a corresponding OR 46 which is connected to reset the memory circuit 24 via a general system reset R or line 49. Thus, the next largest mutual information voltage will be selected next, etc. Then, as explained, the closed loop avoidance module becomes active.

CLOSED LOOP AVOIDANCE MODULE

Each of the output lines 312, 313, 314, 315, 316; 323, 324, 325, 326; 334, 335, 336; 345, 346 and 356 forming cable 39 from the 15 flip-flops 29 is connected to one or two of the closed loop input OR gates, and if connected to only one, then it is also connected to one of the control gates. Note that the least two numerals identify the sources of the output lines, re $X_i, X_j$.

The $X_1X_2$ output line 312 is connected to mask 2's input line 102 to operate mask gate 122 and it is also connected to write prefix 1's OR gate 109 connected by line 110 to operate write control gate 111.

Line 313 from $X_1X_3$ flip-flop 29 is connected to mask suffix 3 OR gate 93 connected by line 103 to operate mask suffix 3 control gate 123 and to write prefix 1's OR gate 109, as was line 312, and as are the other $X_1$ lines 314, 315 and 316.

Line 314 is connected to mask 4's OR gate 94 which is connected by line 104 to mask control gate 124.

Line 315 is connected to mask 5's OR gate 95 which is connected by line 105 to mask control gate 125.

Similarly, line 316 is connected to mask 6's OR gate 96 which is connected by line 106 to mask control gate 126.

Line 323 for $X_2X_3$ is connected to the input of mask suffix 3's OR gate 93, and to the input of prefix 2's WRITE OR gate 119 as are lines 324, 325, and 326 from $X_2X_4$, $X_2X_5$ and $X_2X_6$ flip-flops 29 respectively. OR gate 119 is connected by line 120 to WRITE CONTROL gate 121. Line 324 is also connected to mask suffix 4's OR gate 94. Line 325 is connected to mask 5's suffix OR gate 95; line 326 is connected to mask 6's suffix OR gate 96.

Line 334 for $X_3X_4$ is connected to the input of mask 4's suffix OR gate 94 and to write 3's prefix OR gate 129 to which lines 335 and 336 are also connected. Write OR gate 129 is connected by line 130 to the input of write control gate 131.

Lines 345 and 346 are connected to the inputs of write 4's prefix OR gate 139 connected by line 140 to the write control gate 141. Line 345 is also connected to mask OR gate 95 and line 346 to mask OR gate 96.

Line 356 for $X_5$ and $X_6$ is connected directly to line 150 to write prefix 5 control gate 151, and is also connected to mask 6 suffix OR gate 96.

Thus each of the selection flip-flops 29 turns on one of the write and one of the mask control gates 111, 121, 131, 141, 151 and 122, 123, 124, 125 and 126 respectively.

Six correlation registers $C_1$ to $C_6$, 161 to 166 have outputs connected to the mask and write control gates 111, etc., and 122 to 126 to transfer the three bits in the correlation registers to the corresponding write or mask register.

Thus correlation register $C_1$ 161 is connected by line 171 to write control gate 111, and the value therein will be transferred to the write register 80 whenever $X_1$ or prefix 1 inputs are received by OR gate 109.

Correlation register $C_2$ 162 is connected to write control gate 121 and mask control gate 122 by line 172. Correlation register $C_3$ 163 is connected to write control gate 131 and mask control gate 123 by line 173. Correlation register $C_4$ 164 is connected to write control gate 141 and mask control gate 124 by line 174. Correlation register $C_5$ 165 is connected to write control gate 151 and mask control gate 125 by line 175. Correlation register $C_6$ 166 is connected to mask control gate 126 by line 176.

The output lines 171, 172, 173, 174, 175 and 176 of the correlation registers are also connected to the comparison transfer unit 100.

Initially each of the correlation registers $C_1$ to $C_6$ is preset to a different integer from the other five registers by a ring circuit 210 for resetting them, which is actuated by the general pattern teaching system reset input R.

The output of the write register 80 comprises three lines 181—183 which is connected to the comparison and transfer circuit 100 as is the 3-line output 200—202 of the mask register 89. The output lines 181—183 and 200—202 are connected to control circuit 36 which operates as an overall EXCLUSIVE OR for the two sets of three lines.

CLOSED LOOP SEARCHING LOGIC

In general, the closed loop searching logic system is described below in connection with FIGS. 3A—3K, particularly 3J and 3K. A more detailed description of that system follows this section with reference to FIG. 5.

A number is read into the write register 80 through the selected one of the write control gates from the associated correlation register $C_n$, where $n$=1, 2... 6. Similarly another correlation register value is read into the mask register 89.

Then after the above steps are completed, the outputs of the write and mask registers pass the two newly received values down to the comparison and transfer circuits 100, where gates open input circuits for the write value to be transferred into any correlation registers which contain the identical binary value contained in the mask register. Then, the process is repeated until all of the correlation registers contain the same value.

If the mask register 89 and the write register 80 should contain the same value, then no correlation register change would occur.

In addition, if the write register and mask register outputs differ, then the output of the control and EXCLUSIVE OR circuits 36 will be positive and a signal on lines 39 and 40 will cause the values to be transferred through gates 41, 42, and 43 to the appropriate tree configuration flip-flops 51, 52, ... 53 from cable 39, etc.

As an example refer to FIG. 2A in which a chart is shown setting forth a hypothetical set of mutual information values derived from the 15 computers 20.

STEP ONE:

The system will then select the largest mutual information value which is $I_{35}$ with a value of 0.60. Accordingly, the flip-flop 29 for $X_3X_5$ will be turned on and as a result line 335 will turn on mask 5 OR gate 95 and write 3 OR gate 129 which via lines 105 and 130 will turn on mask control gate 125 connected to $C_5$ 165 and write control gate 131 connected to $C_3$ 163. Assuming the correlation values are as shown by the subscripts, then "MASK" equals "FIVE" and "WRITE" equals "THREE." As a result, the control circuit 36 will find a difference and provide a selection output on line 35. This is reflected by the line from $X_3$ to $X_5$ in FIG. 2B labeled 1. Also the MASK value of FIVE will be used in the comparison and transfer circuit 100 to open correlation register $C_5$ 166 to receive the value of THREE in the write register. Now the result is as follows:

$C_1$=1

$C_2$=2

$C_3$=3

$C_4$=4

$C_5$=3

$C_6$=6

STEP TWO:

Next, the maximum value selected will be $I_{14}$ which equals 0.59. The output for $X_1X_4$ is on line 314 which passes through the write 1's OR gate 109 and line 110 to write control gate 111 for connecting to correlation register $C_1$ 161. The line 314 also turns on mask 4's OR gate 94 turning on control gate 124 and connecting FOUR from correlation register $C_4$ 164 into MASK. The WRITE value will be ONE. As the write and mask values differ, the output on line 35 will record the value of one on line 314 in a tree configuration flip-flop 51, 52, 53, etc. associated with the recognition AND gates 56, 57, 58, etc. Accordingly, the second limb of the tree will be formed as shown in FIG. 2B. The MASK value of FOUR will open the correlation registers containing fours. Accordingly, register $C_4$ 164 will have the WRITE value of ONE stored therein. The correlation registers will now read as follows:

$C_1=1$ $C_2=2$ $C_3=3$ $C_4=1$ $C_5=3$ $C_6=6$.

STEP THREE:

In this case the value of 0.58 for $I_{36}$ is largest and it causes a WRITE value of THREE from $C_3$ 163 and a MASK value of SIX from $C_6$ 166. This value is also selected as a limb. The value SIX in MASK causes the sixth correlation register $C_6$ 166 to receive the WRITE value of THREE. Thus, the values in the correlation registers are as follows:

$C_1=1$ $C_2=2$ $C_3=3$ $C_4=1$ $C_5=3$ $C_6=3$.

STEP FOUR:

Next, the value $I_{45}$ of 0.56 appears largest, causing the value THREE to be carried to the MASK register from correlation register $C_5$ 165 and the value ONE to be carried to the WRITE register 80 from the correlation register $C_4$ 164. As a result, the value of $I_{45}$ will be selected.

In this case, since the MASK value is THREE, and $C_3$, $C_5$ and $C_6$ contain threes, all of those registers will be supplied with the WRITE value of ONE. Now the $C_n$ values are as follows:

$C_1=1$ $C_2=2$ $C_3=1$ $C_4=1$ $C_5=1$ $C_6=1$

It is clear that only by selecting a mutual information value which will read a value from $C_2$ into one of the WRITE and MASK registers 80 and 89 will there be a difference, and hence only then will there be a selection of a mutual feature.

STEP FIVE:

The value of $I_{16}$ equals 0.55 which is next largest. This causes $C_6$ register 166 with a value of ONE to connect to MASK and $C_1$ register 161 with a value of ONE to connect to WRITE. Accordingly, the value will not be selected, and also because of identity, the correlation values will be unchanged.

STEP SIX:

The next largest value is $I_{23}$ which equals 0.68.

In this case the value of ONE in $C_3$ register 163 is read into the MASK and the value of TWO in the $C_2$ register 162 is read into WRITE. Accordingly, this value is also selected. Further, since the MASK value is ONE, TWO will be read into $C_1$, $C_3$, $C_4$, $C_5$ and $C_6$ and all correlation registers will read TWO. Further the entire tree will have been selected as shown in FIGS. 2B and 2C, and it will include $n-1=5$ (where $n=6$ features) limbs of a tree between six points.

The output pulses for each selection pass on line 35 to a counter 147 in the sawtooth start control 32. Outputs of the $(n-15)$ register 146 and the counter 147 pass to a comparator 145, which provides a positive input to AND gate 144 until the output of counter 147 equals the output of the register 146. A flip-flop 143 is connected to the other input to AND gate 144.

The flip-flop 143 is reset to zero upon each reset of the general teaching system. Line 33 from a blade 22 of relay 18 actuates the flip-flop 143 upon operation of the relay 18. Thus the sawtooth start gate 149 will not receive a control input from AND 144 via line 148 until the relay 18 operates; and gate 149 will be turned off when the counter 147 reaches five.

Accordingly, the sawtooth sweep begins only after the relay 18 closes and the set of sweeps ends upon completion of a tree having $n-1$ branches in a system receiving $n$ feature inputs.

DETAILS OF CORRELATION LOGIC

Figure 5:
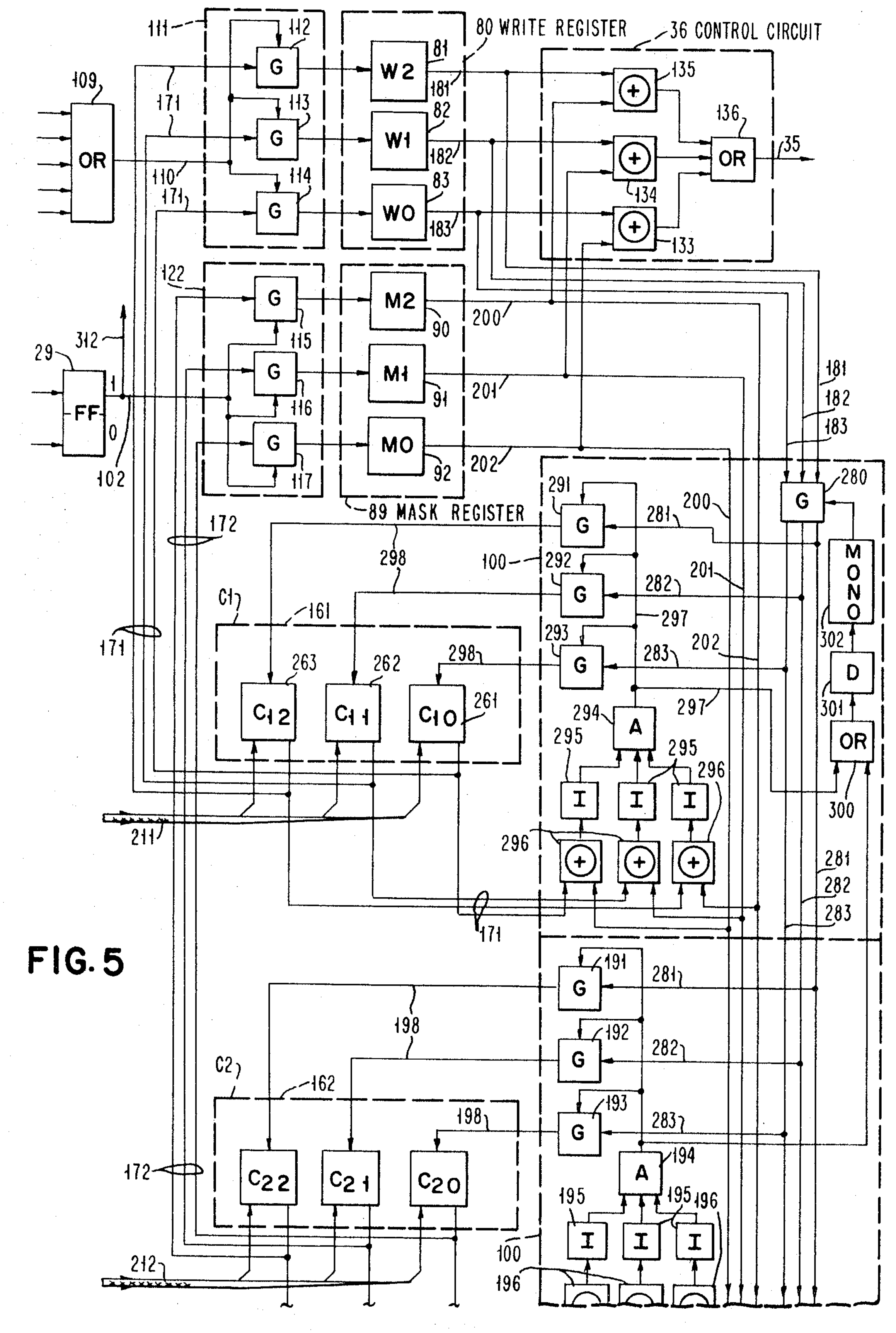
FIG. 5 shows details of construction of the associating structure in the closed loop avoidance circuit and the EXCLUSIVE OR and control circuits in the area generally indicated by phantom line 5–5 in FIGS. 3J AND 3K.

The details of correlation logic in the closed loop avoidance module 38 are described below with reference to FIG. 5.

The write 1 control gate 111 is actually three gates for the 3-bit registers employed for a six-feature pattern recognition system, and includes a write 2-bit control gate 112 having a line 171 connected to present the output of correlator 2-bit register 263. The write control gates 112, 113, and 114 are controlled by the output of write OR 1 prefix 109, via line 110. The 1 and 0-bit lines from correlator 1 and 0-bit registers 262 and 261 are passed through gates 113 and 114. The write register 80 contains the three registers 81, 82, and 83 for 2, 1, and 0 bits. Actually, each of the above lines would be a double line for binary ones and zeros which will be assumed to be obvious.

The mask register 89 contains 2-, 1- and 0-bit registers 90, 91 and 92 which receive inputs from correlation registers $C_{22}$, $C_{21}$ and $C_{20}$ via line 172 when the 2-, 1-, and 0-bit gates 115, 116 and 117 are opened by mask 2 flip-flop 29 for $X_2$ via line 102, when that flip-flop is turned on because, for example, $X_2X_3$ mutual information is largest. Then, the outputs 181—183 of the write register are connected to EXCLUSIVE OR circuits 133, 134 135 in control circuit 36 as are the outputs 200—202 of the mask register, with the 0, 1 and 2 bits being compared. If they are all identical, no outputs will be obtained from any of the EXCLUSIVE OR's which means that OR circuit 136 will provide no output on line 35 and so the mutual information will not be selected.

In addition, lines 200, 201 and 202 connect to a plurality of sets of EXCLUSIVE OR's 296, 196, etc. which couple with the outputs of the sets of three correlation registers such as $C_1$ 261, 262, and 263 and $C_2$ 162. If the outputs after processing by inverters 295, and 195 are all positive indicating equality of mask and $C_1$ and/or $C_2$ register 161 and/or 162 values, then the AND gate 294 and/or 194 and thus the write transfer control gates 291, 292, and 293 and/or 191, 192, and 193 controlled thereby will be operated to connect lines 281, 282 and 283 from gate 280 to the inputs of the correlation registers $C_1$, 261, 262 and 263 and/or $C_2$ 162. If there is an output from any AND 194, 294 et seq. then an OR 300 will operate through a delay 301. After the delay, a monostable circuit 302 will pulse gate 280 to pass the write register output line values on lines 181, 182 and 183 to the lines 281, 282, and 283 and thence to the correlation registers 161, 162 or ... 166 whichever is selected by the comparison and transfer circuit 100.

PATTERN SELECTED GATES

Figure 6:
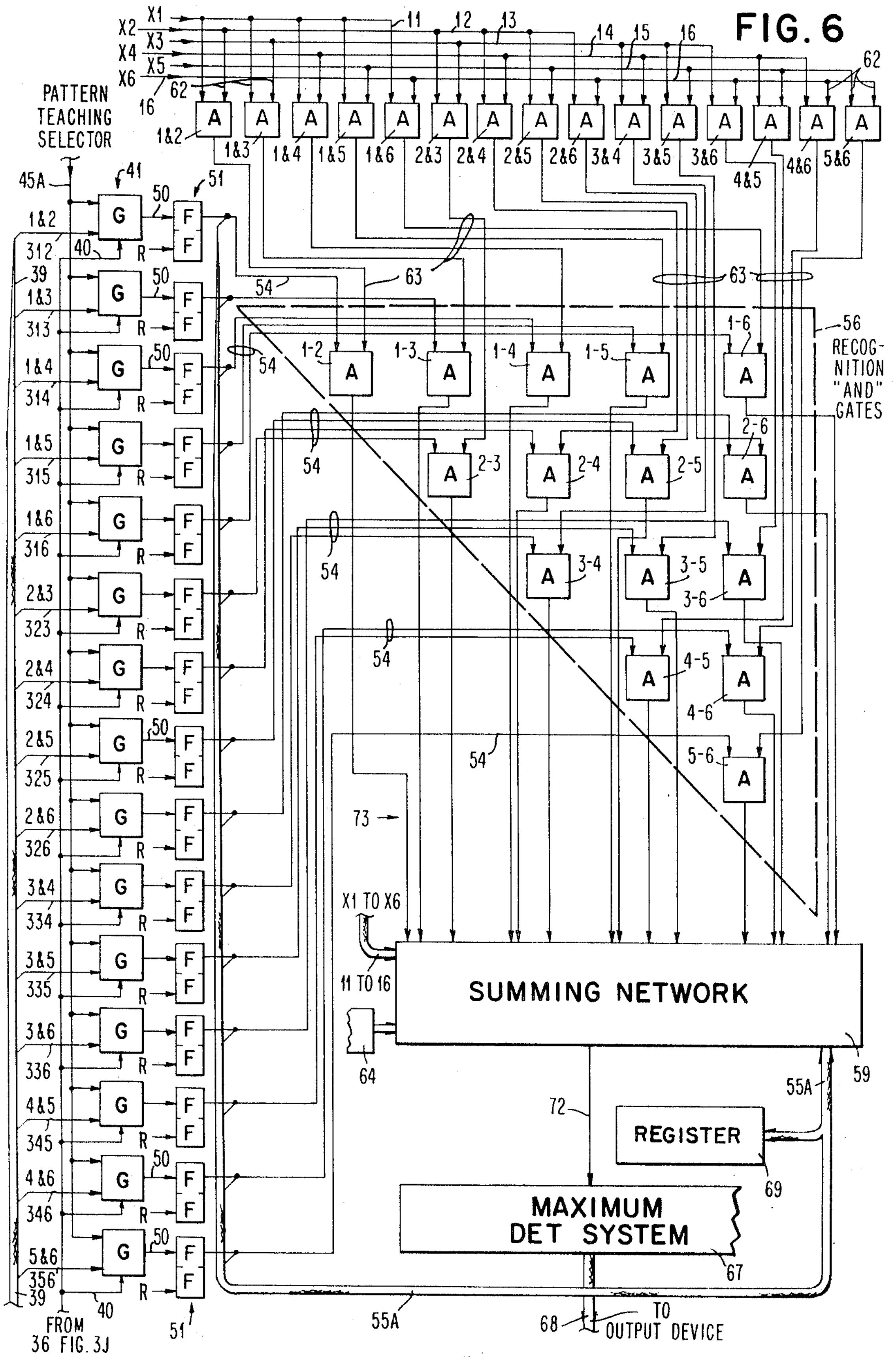
FIG. 6 shows the relationships of a set of pattern selection gates, a set of tree flip-flops, and the internal structure of a recognition gate.

The pattern selection gates 41, 42, and 43 as shown in FIGS. 3 and 6 are connected to the main mutual information output cable 39 with a single one of lines 312—316, 323—326, 334—336, 345—346, and 356 connected to each of those gates. The appropriate pattern teaching selector lines 45A, 45B, and 45N are connected to all of the gates for a single pattern A, B, ... or N. In addition, the EXCLUSIVE OR and control output 35 is connected via line 40 to all of the pattern selection gates in 41, 42 and 43, so that closed loops can be avoided for optimum performance of the pattern recognition system.

Thus each of the pattern selection gates is controlled by the closed loop input on line 35 and by the pattern teaching selector on a line 45A, 45B ... or 45N.

TREE FLIP-FLOPS

When a pattern selection gate 41, 42 ... or 43 is actuated as above, the associated tree flip-flop 51, 52 ... or 53, connected thereto by a line 50, is turned on. Thus in the case of a system with $n$ features where $n=6$, then $(n-1)$ five of the pattern selection gates 41 for example and thus five of the tree flip-flops 51 are turned on to provide control inputs to turn on five of the recognition AND gates 1—2, 1—3... 5—6 shown in FIG. 6.

It is reemphasized at this point that the tree flip-flops record the end result of the teaching portion of operation of the system. If desired, the results of this teaching mode for each pattern can be read out on a register 69 for each set of tree flip-flops by means of lines 55A, 55B and 55N.

RECOGNITION AND GATES

The outputs of the tree flip-flops on lines 54 are connected into the recognition AND gates A, B, ... N 56, 57 ... and 58. For each $X_iX_j$ pair, there is a gate for each pattern, so as in FIG. 6, with $n=6$ there are 15 AND gates for $X_1X_2$, $X_1X_3$ ... $X_5X_6$.

For the 1—2 AND gate, the output of the flip-flop 51 connected by gate 41 to the line 312 for $X_1X_2$ and a line 63 are connected to its inputs. A line 63 is connected to a "combination of two" AND gate 30 which is connected to $X_1$ and $X_2$ source lines 11 and 12 so that during recognition mode of operation, the AND gate 30 for $X_1X_2$ will operate when both $X_1$ and $X_2$ provide pulses in response to a specimen submitted to the feature extracting device 10.

In operation then, for pattern classification or reading, there will be only five AND gates closed if the system is operated with a value of $n-1$ to form an optimal tree structure.

Figure 7:
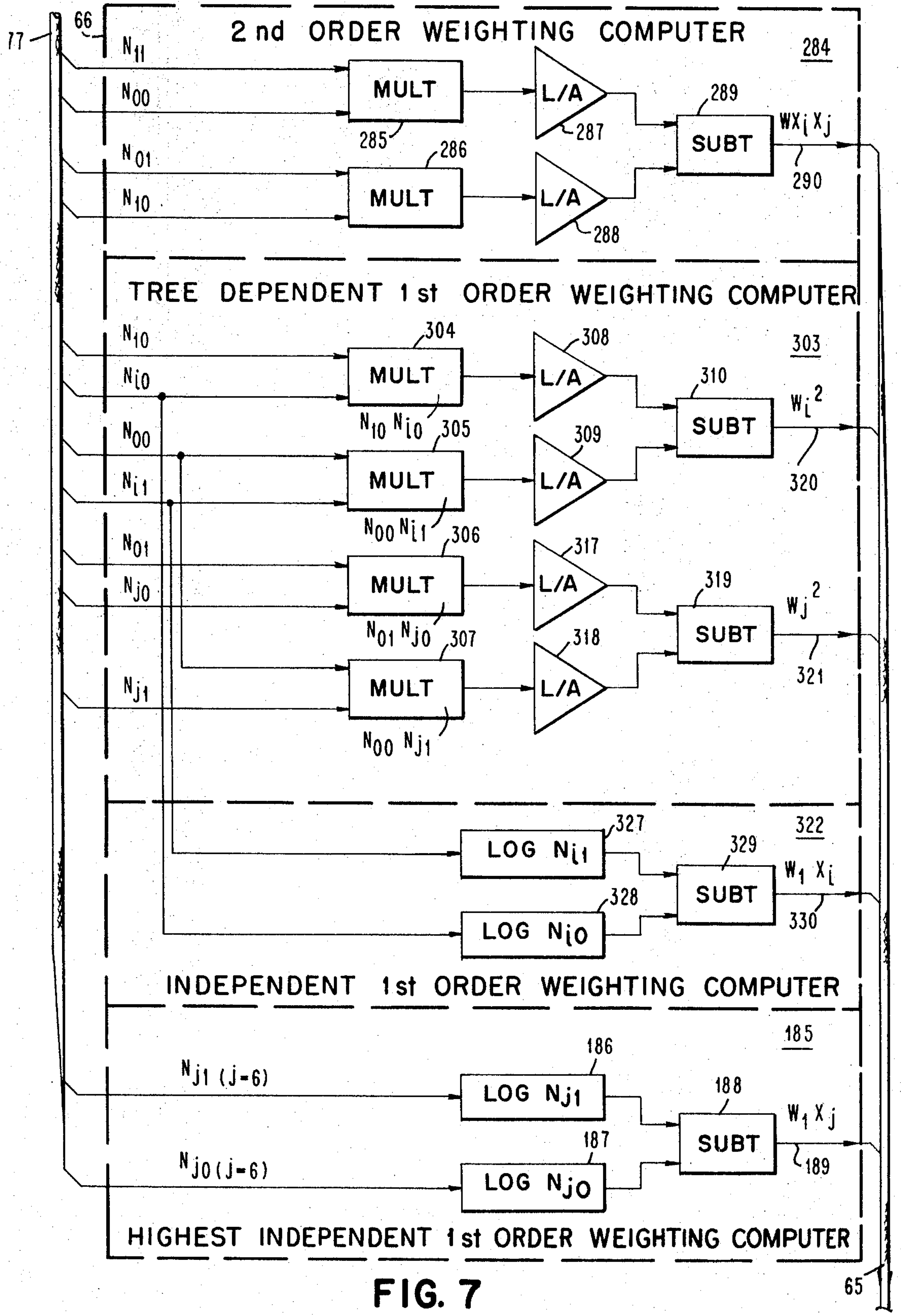
FIG. 7 shows a set of weighting computers for purposes of illustration.
Figures 8, 8A:
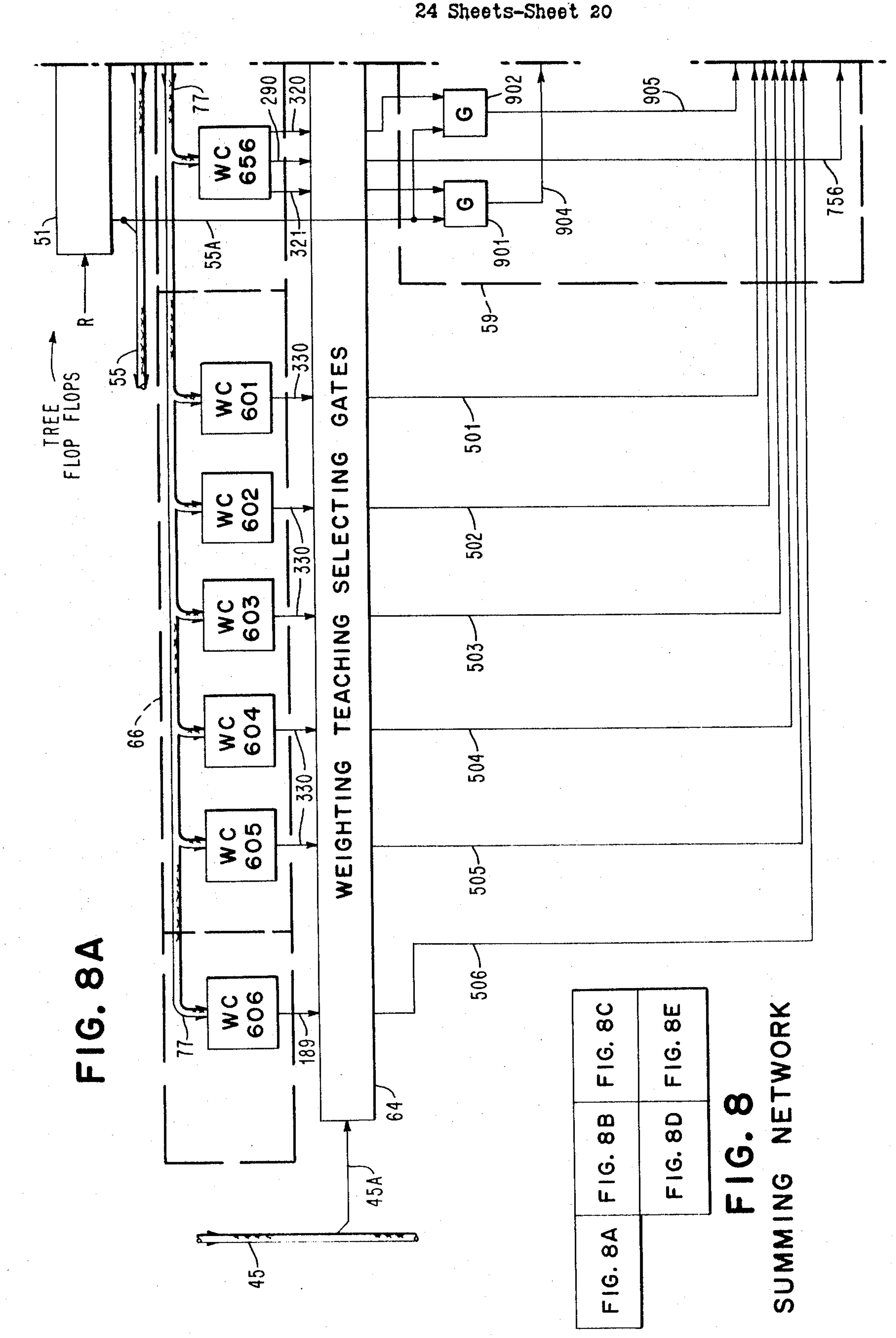
FIG. 8 shows the arrangement of FIGS. 8A—8E which show the relationships among a set of tree flip-flops, a weighting computer, a set of weighting teaching selector gates and the structure of one of the summing networks.
Figure 8B:
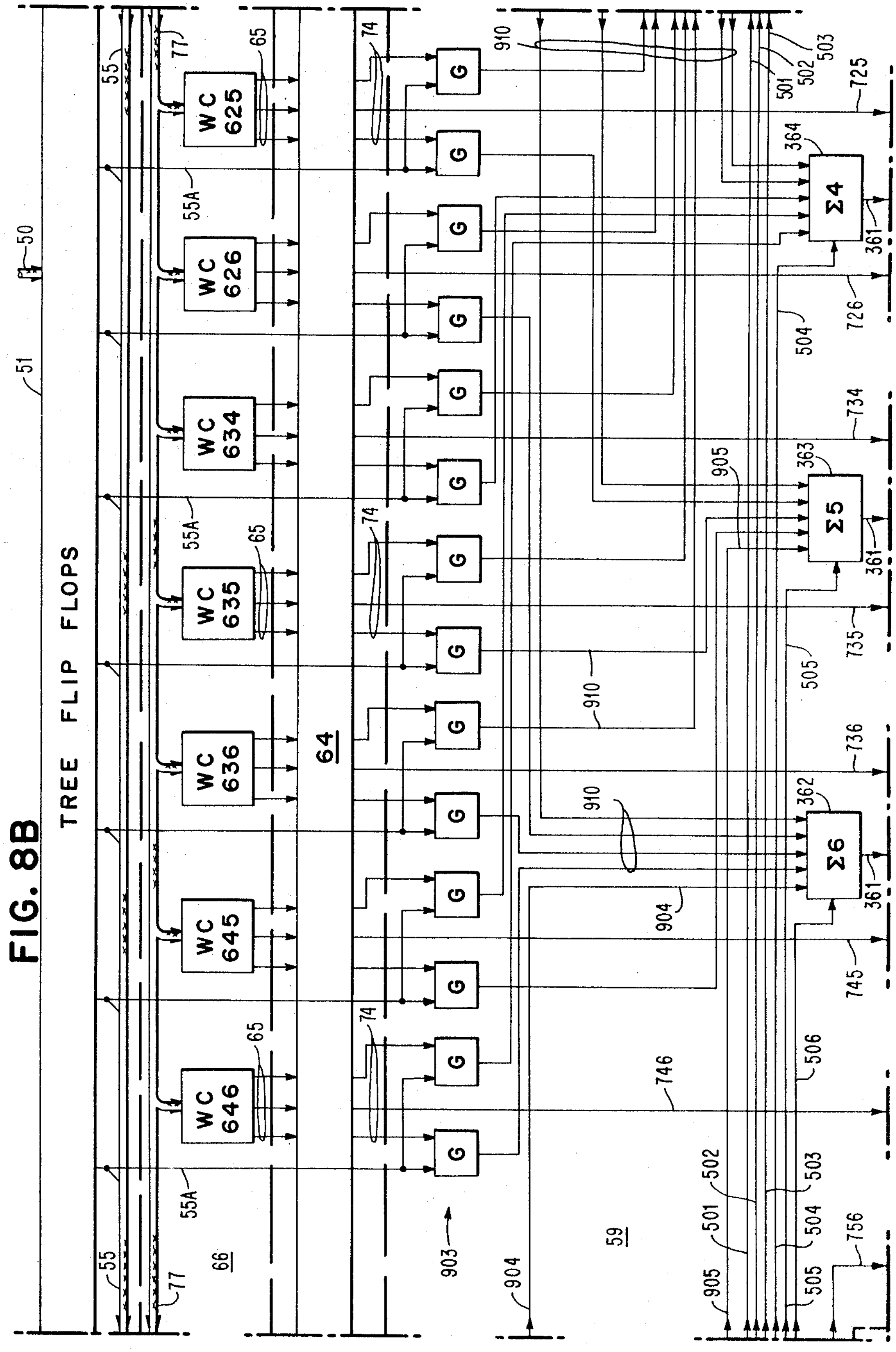
Figure 8C:
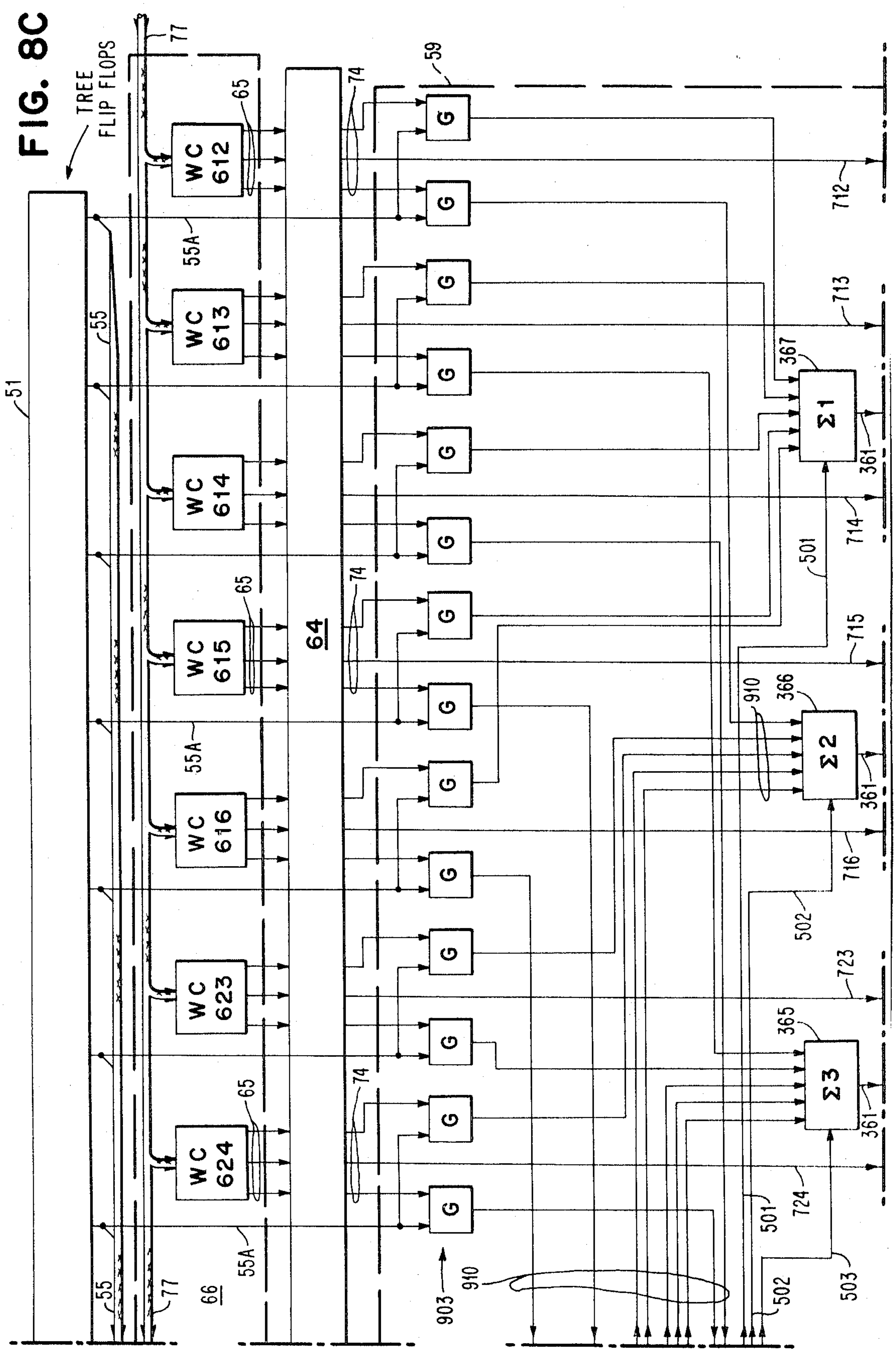
Figure 8D:
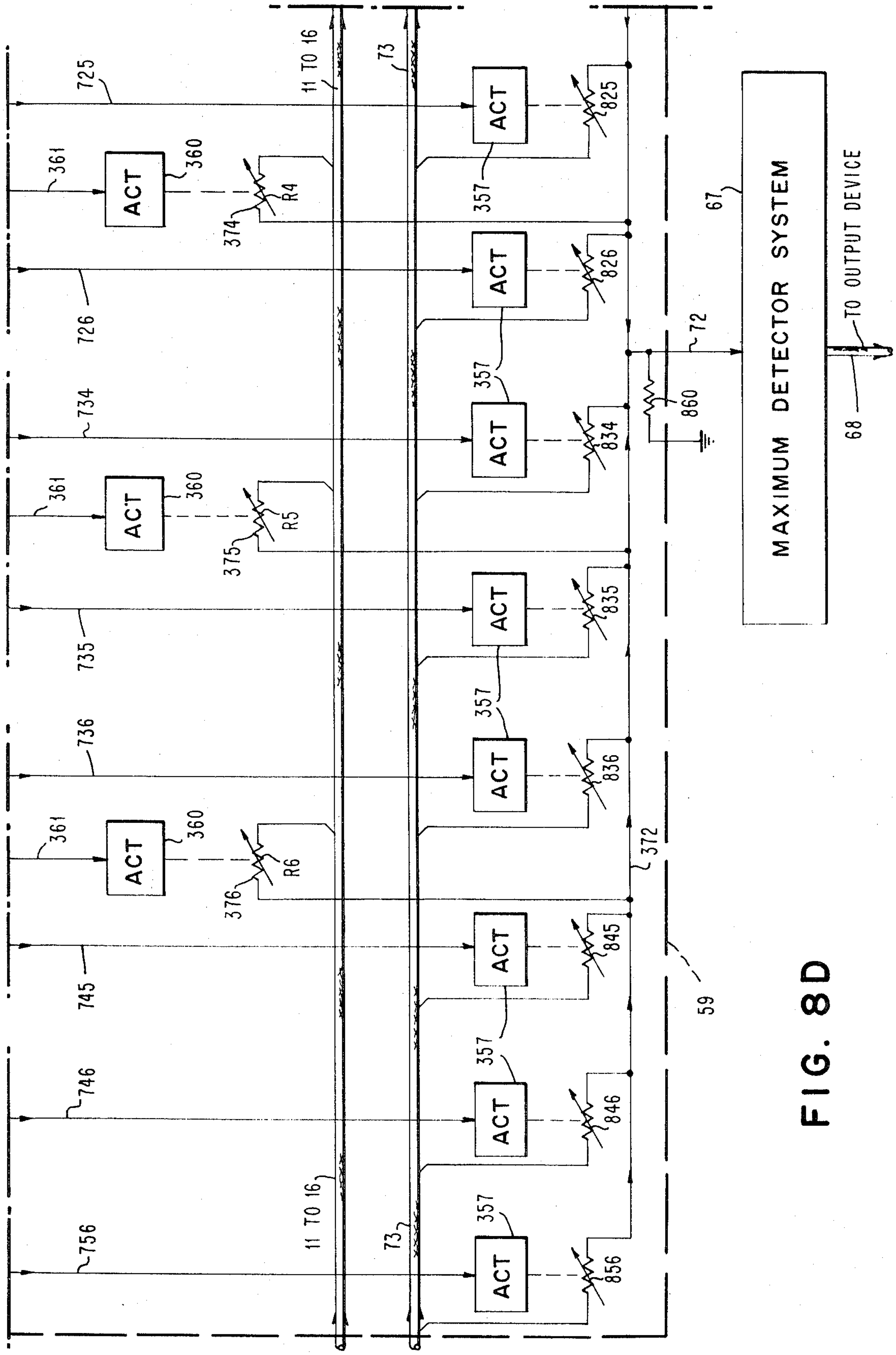
Figure 8E:
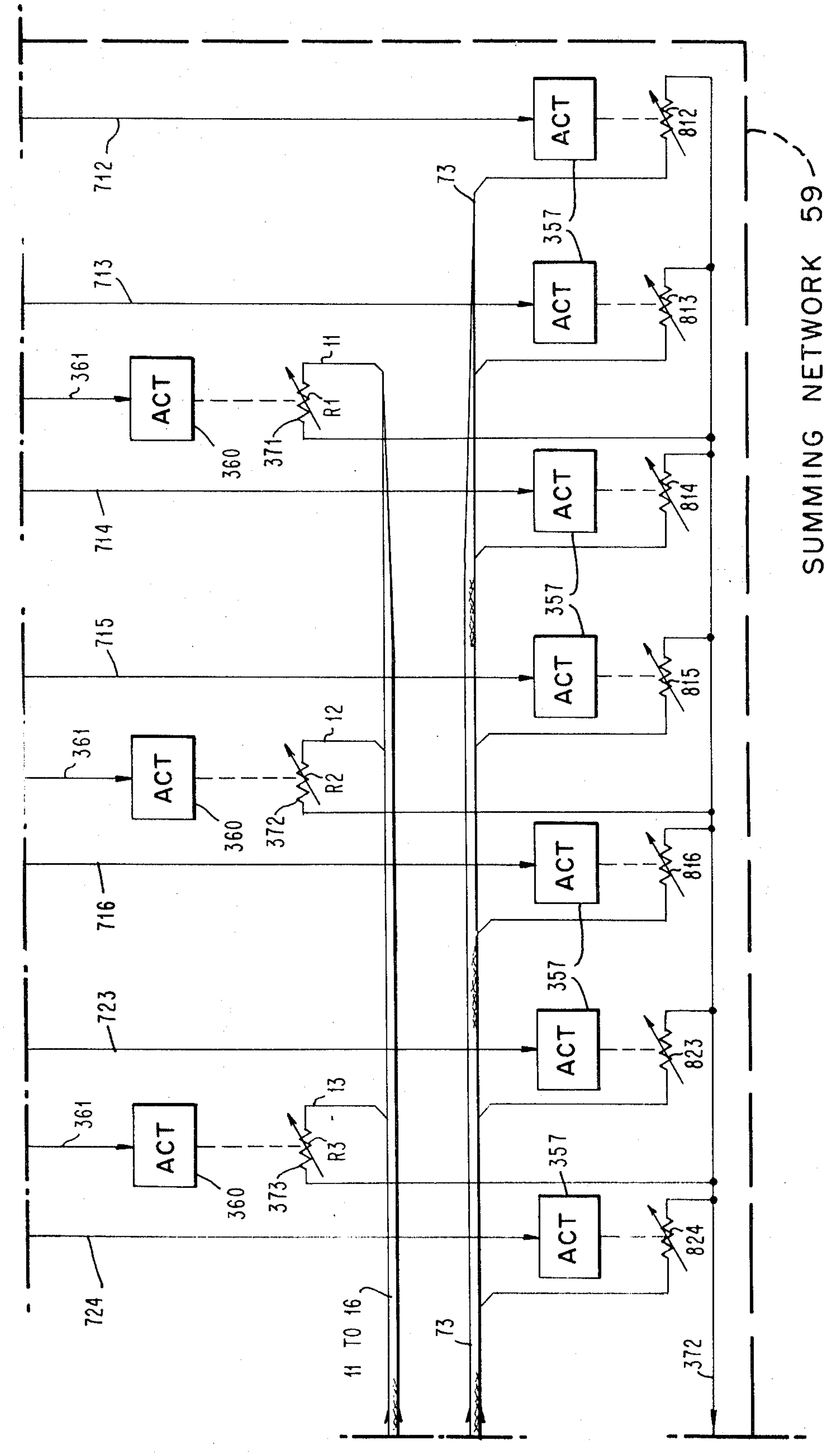

Now, the second order information to be employed for pattern recognition is passed on down into the summing networks 59, 60, and 61 in which it is added in accordance with weights adjusted during the teaching mode of operation of the system by weighting computers 66 shown in FIG. 7.

WEIGHTING COMPUTERS

The reason it is desirable to have weighting computers and weighting is of course the fact that although all of the evidence of a certain pattern which is being considered has a bearing upon the pattern, the degree of relevance or weight is a function of certain probabilities.

The 15 values of second order weights are computed as follows:

$$W_{x_ix_j}=\log\frac{N_{11}N_{00}}{N_{01}N_{10}}$$

The second order weighting computer 284 shown in FIG. 7 may be the one for $i=1$ and $j=2$ or $X_1$ and $X_2$ computer 284 would have its input 77 connected to the output 77 of the mutual information computer shown in FIG. 4B. However, it should be understood that there are 15 such second order weighting computers.

In any event for any given $i$ and any given $j$, the corresponding analogue computer 20 will supply a value of $N_{11}$, $N_{10}$, $N_{01}$ and $N_{00}$ to multiply $N_{11}$ and $N_{00}$ in multiplier 285 and $N_{10}$ by $N_{01}$ in multiplier 386 both of which pass outputs into logarithmic amplifiers 287 and 288 respectively. The two logarithmic amplifiers 287 and 288 drive a subtraction circuit 289 wherein the weight $W_{x_ix_j}$ is yielded on line 290 for transmission via cable 65, as shown in FIG. 1.

The tree dependent first order weighting computers 303 are 15 in number with 15 sets of values for $i$ and 15 sets of values for $j$, relative to the various selected combinations of $X_i$ and $X_j$ providing mutual information.

The equations for tree dependent first order weighting are as follows:

$$W_i^2=\log\frac{N_{01}(N_{01}+N_{00})}{N_{00}(N_{10}+N_{11})}=\log\frac{N_{10}N_{i0}}{N_{00}N_{i1}}$$

$$W_j^2=\log\frac{N_{01}(N_{10}+N_{00})}{N_{00}(N_{01}+N_{11})}=\log\frac{N_{01}N_{j0}}{N_{00}N_{j1}}$$

The reason that these weighting factors are referred to as tree dependent is that the weights are adjustably selected and combined in the summing networks 59, 60...and 61 in response to the tree flip-flop outputs on lines 55A, 55B,... 55N.

The lines coming in are similar to those for the second order weighting computers 284 except that values of $N_{ji}$ which means $N_{10}+N_{11}$ or $i=1$, $N_{i0}$, $N_{j1}$ and $N_{j0}$ are included. These values refer generically to any $i$ and any $j$ values from 1—6 and the 0 or 1 refers to the state of $X_i$ or $X_j$ statistically.

Thus multiplier 304 multiplies $N_{10}$ and $N_{i0}$, as does multiplier 305, $N_{00}$, $N_{i1}$, as does multiplier 306 $N_{01}$, $N_{j0}$, and as does multiplier 307 $N_{00}$ and $N_{j1}$. The outputs of multipliers 304 and 305 are passed respectively into logarithmic amplifiers 308 and 309 which connect to subtraction circuit 310, which yields $W_i^2$ output 320.

Similarly logarithmic amplifiers 317 and 318 process multipliers 306 and 307 outputs into subtraction circuit 319 which provides an output on line 321 which comprises $W_j^2$.

In addition an independent weighting value $W_1X_i$ is required for each of five values of $i$ in this case and these can be derived from any five of the 15 analogue computers which provide the values $N_{i1}$ and $N_{i0}$ which must be processed in computer 322 by log amplifiers 327 and 328 respectively for subtraction by subtraction unit 329 to provide the output value on line 330 which is as follows:

$$W_1X_i=\log\frac{N_{i1}}{N_{i0}}$$

Similarly a single value of $j=6$ must be calculated in the single highest independent first order weighting computer 185. Logarithmic amplifiers 186 and 187 process $N_{j1}$ and $N_{j0}$ to subtraction unit 188 to provide an output 189 the value as follows:

$$W_1X_j=\log\frac{N_{j1}}{N_{j0}}$$

SUMMING NETWORK

The summing network 59 for pattern A is shown in FIGS. 8A—8E.

The pattern A tree flip-flops 51 are connected into summing network 59 by lines 55A to control the pattern weight gates 901, 902 and 903. The weight computers 612—616, 623—626, 634—636, 645, 646 and 656 have two first order tree dependent outputs such as outputs 320 and 321 of computer 656 connected to control opposite gates 901 and 902 from weight computer 656.

There is a pattern weight gate 902, or 903 for the prefix ($X_i$) value and another one 901, or 903 for the suffix value ($X_j$) of each weight computer.

There are six summing networks 362, 363, 364, 365, 366 and 367. Network 362 for number 6 receives five inputs on lines 904, and 910 from gates for values of $X_6$ from the weight computers 616, 626, 636, 646 and 656 through which $X_6$ values are connected. From the right side of each computer 612 et seq. comes the lower base $W_{x_i}$ value and from the left the higher base $W_{x_j}$ value. Thus, in all, five lines converge on the summing network 362 from WC 616, WC 626, WC 636, WC 646 and WC 656 from the four corresponding left-hand gates 903 via lines 910 and also left-hand gate 901 via line 904 associated with those computers.

Similarly summing unit 363 for 5's draws inputs from WC 615, WC 625, WC 635, WC 645 on the left (higher) side and WC 656 on the right lower side through gates 903, and 902, via line 905. The analogous connections are shown for summing units for 4, 3, 2, and 1, 364, 365, 366 and 367.

In addition, the six fixed value weights $W_iX_i$ and $W_iX_j$ from WC 606, WC 605, WC 604, WC 603, WC 602, and WC 601 are connected via lines 189 and 330 in cables 65 and 74 to the corresponding summing units 362—367.

All of the six values remain constant regardless of changes in the tree structure as these weights are not tree dependent.

The outputs of the six summing units 362—367 are connected by lines 361 to actuators 360 which are adapted to drive variable resistors 376, 375, 374, 373, 372 and 371 respectively corresponding to summing units 362, 363...367. Those six resistors are connected according to values 6, 5, 4, 3, 2, 1 for 362, 363...367 to lines 16 to 11 for $X_6$, $X_5$...$X_1$, respectively as inputs; and the resistor outputs are connected to the line 372 connected to line 72 and resistor 860 connected to ground for the purpose of summing the inputs as adjusted by the weighting resistors 371—376 and 812—816, 823—826, 834—836, 845—846 and 856.

In addition to the six above-described weighting resistors 371—376, there are the 15 weighting resistors 812 et seq. just mentioned, which are adjusted by actuators 357 connected by lines 712—716, 723—726, 734—736, 745—746, and 756 to the outputs of the corresponding weight computers 612 et seq. through weighting teaching selecting gates 64 so that for each weight selected for each cross product $X_iX_j$, the appropriate resistance can be automatically selected by the actuators 357 and 360. The inputs to the variable resistors 812—816, et seq. are connected via cable 73 to the outputs of the pattern selection gates on cable 73 so that the five selected tree cross-product values will be weighted appropriately and the others will be adjusted though not utilized.

As explained the entire output on line 72 from each summing network 59, 60...61, is connected to a standard maximum detecting circuit 67 which may resemble the circuits of FIGS. 3A, 3B, 3C and 3D, in part.

The system may include as many patterns as desired.

It is contemplated that some of the parallel functions performed here could be performed serially for the purpose of reducing the volume of equipment.

While the invention has been particularly shown and described with reference to a preferred embodiment thereof, it will be understood by those skilled in the art that the foregoing and other changes in form and details may be made therein without departing from the spirit and scope of the invention.

We claim:

1. Pattern recognition apparatus comprising:

identifying means for identifying the interdependence between all states of sets of at least two characteristics among a plurality of measurements of samples of at least one pattern presented to the input of said identifying means;

selecting means for selecting sets of characteristics for identification of unknown patterns which sets have a level of interdependence above a given level coupled with said identifying means;

coupling means for coupling all states of corresponding selected sets of inputs representing characteristics of unknown patterns, coupled with and responsive to said selecting means to couple only said selected sets from its input to its output;

weighting means for adjusting weighting assigned to said selected sets of inputs of unknown patterns coupled through said coupling means, and cooperating with said coupling means to operate upon said selected sets; and output means connected to the combined output of said means for coupling and said weighting means for indicating the degree of identity between said measurements of samples and said inputs of unknown patterns.

2. Apparatus for pattern recognition comprising calculating means for calculating probabilities that a given combination of characteristics is indicative of a certain pattern of characteristics based on previously analyzed samples:

tree preparing means for preparing data comprising representations of tree dependence relationships between points representative of said characteristics of said previously analyzed samples based upon the output of said calculating means coupled with said calculating means; and storage means for storing data comprising representations of tree dependence relationships from said tree preparing means coupled with said tree preparing means; and means for processing characteristics of patterns in accordance with said stored representations of tree dependence for pattern identification coupled with said storage means.

3. Apparatus for classifying specimens of a plurality of patterns to be recognized comprising means for calculating the amounts of mutual information between pairs of characteristics of those specimens provided by a plurality of pairs of sensing devices:

means for measuring several largest amounts out of a plurality of related amounts of mutual information relative to each pattern;

means for sequentially identifying a select set of characteristics generally containing the largest amounts of mutual information which avoids identifying sets of characteristics in a sequence which include a given characteristic a second time relative to each pattern;

a plurality of means for storing the identification of said select sets of characteristics with one for each pattern;

means for coupling unknown pattern signals having control inputs;

transmitting means for transmitting signals indicative of mutual information relating to said select sets of characteristics from a means for feature extraction to said sets of means for coupling unknown pattern signals;

a plurality of means for weighted summing with one for each pattern;

means for maximum detection adapted to determine which of a plurality of signals provided thereto is largest; and each of said means for coupling having its control inputs controlled by its means for storing identification said means for coupling then transmitting select sets of signals through said means for weighted summing into an input of said means for maximum detection, whereby said means for maximum detection provides an output indicative of the pattern associated with the largest sum of said sums of said select sets of signals.

4. Apparatus for classifying specimens comprising means for calculating the mutual information provided by pairs of features from feature extraction elements:

means for identifying said features;

selection means for selecting sets of features containing the largest values of mutual information;

recording means for recording the identification of said sets of features containing said largest values of mutual information; and means for identifying an unknown pattern based upon processing of the values supplied by said feature extraction elements for said identified sets of features for said unknown pattern.

5. Means for receiving inputs relative to a plurality of pattern characteristics of a plurality of samples:

means for calculating the mutual information of said samples;
means for measuring high orders of dependence between characteristics of samples;
means for selecting a simulated tree structure in cooperation with said means for measuring;
sample input means for processing specimens to be identified, said sample input means being coupled to means for sensing dependent sets of characteristics included within said tree structure; and
means for combining the outputs of said means for sensing dependent sets.

6. Apparatus in accordance with claim 5 including:
means for weight determining adapted to receive inputs relative to said samples to determine the weight to be assigned to pairs of characteristics for which corresponding mutual information is calculated; and
means for adjusting said means for combining the outputs in accordance with weights determined by said means for weight determining.

7. Apparatus for pattern identification including:
means for presenting $n$ pattern features where $n$ is an integer larger than one;
means for determining mutual information from a plurality of samples of a selected pattern from said means for presenting $n$ pattern features;
means for selecting $n-1$ mutual information values providing maximum values within the limitations of a simulated tree structure without double inclusion of a particular feature;
means for storing said tree structure of mutual information dependence and precessing unknown patterns through said apparatus through adjustment of the structure thereof to provide a record of an $n-1$ limb simulated tree structure; and
means for analyzing unknown pattern specimens adapted to operate in accordance with the output of said means for storing.

8. A method of operating data handling apparatus comprising:
identifying the interdependence between all states of sets of at least two characteristics among a plurality of measurements of samples of at least one pattern presented to said data handling means;
selecting sets of characteristics for identification of unknown patterns which sets have a level of interdependence above a given level based upon the results of said identifying step;
coupling for further analysis all states of corresponding selected sets of inputs representing characteristics of unknown samples in response to said selecting step to couple only said selected sets;
adjusting weighting assigned to said coupled and selected sets of inputs of unknown patterns; and
measuring the combined output of said coupling and said weighting steps for determining the degree of identity between the measurements of samples and the inputs of unknown patterns.

9. A method for operating data handling apparatus for pattern recognition comprising:
calculating probabilities that a given combination of characteristics is indicative of a certain pattern of characteristics based on previously analyzed samples;
tree preparing by preparing data comprising representations of tree dependence relationships between points representative of said characteristics of said previously analyzed samples based upon the output of said calculating step;
storing data comprising representations of tree dependence relationships from said tree preparing step; and
processing characteristics of patterns in accordance with said stored representations of tree dependence for pattern identification.

10. A method of operating data handling apparatus for classifying specimens of a plurality of patterns to be recognized comprising:
calculating the amounts of mutual information between pairs of characteristics of sensed specimens;
measuring several largest amounts out of a plurality of related amounts of mutual information relative to each pattern;
sequentially identifying a select set of characteristics generally containing the largest amounts of mutual information while avoiding identifying sets of characteristics in a sequence which include a given characteristic a second time relative to each pattern;
storing the identification of said sets of characteristics for each pattern;
transmitting signals indicative of mutual information relating to said select sets of characteristics from an unknown pattern to couple unknown pattern signals;
performing weighted summing of said sets of characteristics for each pattern;
coupling unknown pattern signals in accordance with the identification of sets stored in said means for coupling;
then performing weighted summing of select signals; and
detecting the maximum values to determine which of a plurality of signals provided thereto is largest, and identifying the pattern based on the largest said value.

11. A method of operating data handling apparatus for classifying specimens comprising calculating the mutual information provided by extracting features from pairs of elements:
identifying said features;
selecting the sets of features containing the largest values of mutual information, where mutual information is defined by the formula $$I(x_i, x_j) = \sum_{x_i, x_j} P(x_i, x_j) \log \frac{P(x_i, x_j)}{P(x_i)P(x_j)}$$

where $x_i$ and $x_j$ are any two characteristics;
recording means for recording the identification of said largest values of mutual information; and
identifying an unknown pattern based upon processing of the values supplied by feature extraction elements for said identified sets of characteristics for said unknown pattern.

12. A method of operating data handling apparatus for receiving inputs relative to a plurality of pattern characteristics of a plurality of samples:
calculating the mutual information of said samples;
measuring high orders of dependence between characteristics of samples;
selecting a simulated tree structure based upon the orders of dependence derived in the preceding step;
processing specimens to be identified;
sensing dependent sets of characteristics included within said tree structure; and
combining the output of said dependent sets sensed.

13. A method of operating data handling apparatus in accordance with claim 12 including:
determining relative weights to be assigned to pairs of characteristics for which corresponding mutual information is calculated; and
adjusting the combination of values of processed specimens in accordance with weights determined by said means for weight determining.

14. A method of operating data handling apparatus for pattern identification including:
presenting $n$ pattern features where $n$ is an integer larger than one;
determining mutual information from a plurality of samples of a selected pattern from $n$ pattern features presented;
selecting $n-1$ mutual information values providing maximum values within the limitations of simulated tree structure without double inclusion of a particular feature; and storing said tree structure of mutual information dependence and processing unknown patterns through said apparatus through adjustment of the structure thereof to provide a record of an $n-1$ limb simulated tree structure; and analyzing unknown pattern specimens adapted to operate in accordance with the stored values.